(12) United States Patent
George et al.

(10) Patent No.: US 10,255,699 B2
(45) Date of Patent: Apr. 9, 2019

(54) GENERATING A CURATED DIGITAL ANALYTICS WORKSPACE

(71) Applicant: Adobe Inc., San Jose, CA (US)

(72) Inventors: William Brandon George, Pleasant Grove, UT (US); Matthew Bryan, Pleasant Grove, UT (US); Benjamin R. Gaines, Highland, UT (US); Kristopher Paries, Lehi, UT (US); Bret B. Gundersen, Orem, UT (US)

(73) Assignee: ADOBE INC., San Jose, CA (US)

( * ) Notice: Subject to any disclaimer, the term of this patent is extended or adjusted under 35 U.S.C. 154(b) by 33 days.

(21) Appl. No.: 14/866,446

(22) Filed: Sep. 25, 2015

(65) Prior Publication Data
US 2017/0091968 A1    Mar. 30, 2017

(51) Int. Cl.
*G06T 11/20* (2006.01)
*G06Q 30/02* (2012.01)

(52) U.S. Cl.
CPC ............ *G06T 11/206* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 7,002,580 B1* | 2/2006 | Aggala | ................. | G06T 11/206 345/440 |
| 7,705,847 B2* | 4/2010 | Helfman | ............... | G06F 17/246 345/440 |
| 9,870,581 B1* | 1/2018 | Vormweg | ........... | G06Q 30/0609 |
| 2009/0287673 A1* | 11/2009 | Chronister | ........ | G06F 17/30994 |
| 2010/0280985 A1* | 11/2010 | Duchon | ................ | G06Q 10/10 706/52 |
| 2011/0258125 A1* | 10/2011 | Iyer | ........................ | G06Q 10/10 705/301 |
| 2014/0180804 A1* | 6/2014 | Jordan | ............... | G06Q 30/0254 705/14.52 |
| 2014/0330821 A1* | 11/2014 | Tullis | ................ | G06F 17/30398 707/728 |
| 2014/0331179 A1* | 11/2014 | Tullis | ..................... | G06Q 10/10 715/811 |
| 2015/0278315 A1* | 10/2015 | Baumgartner | .... | G06F 17/30554 715/763 |
| 2017/0046016 A1* | 2/2017 | Riche | ...................... | G06F 17/30 |

* cited by examiner

*Primary Examiner* — Xiao M Wu
*Assistant Examiner* — Steven Z Elbinger
(74) *Attorney, Agent, or Firm* — Keller Jolley Preece

(57) ABSTRACT

Systems and methods are disclosed for generating a curated digital analytics workspace. In particular, in one or more embodiments, the disclosed systems and methods curate a digital analytics workspace based on a variety of factors to generate a curated digital analytics workspace capable of dynamically analyzing digital data elements. More specifically, one or more embodiments of the disclosed systems and methods limit data elements and/or analytics visualizations available in a digital analytics workspace based on user characteristics, data element features, or other factors to generate a curated digital analytics workspace. In this manner, the disclosed systems and methods can generate a curated digital analytics workspace that provides access to data elements and/or analytics visualizations targeted to the needs and capabilities of an individual or group while reducing confusion that often results from traditional analytics systems.

20 Claims, 17 Drawing Sheets

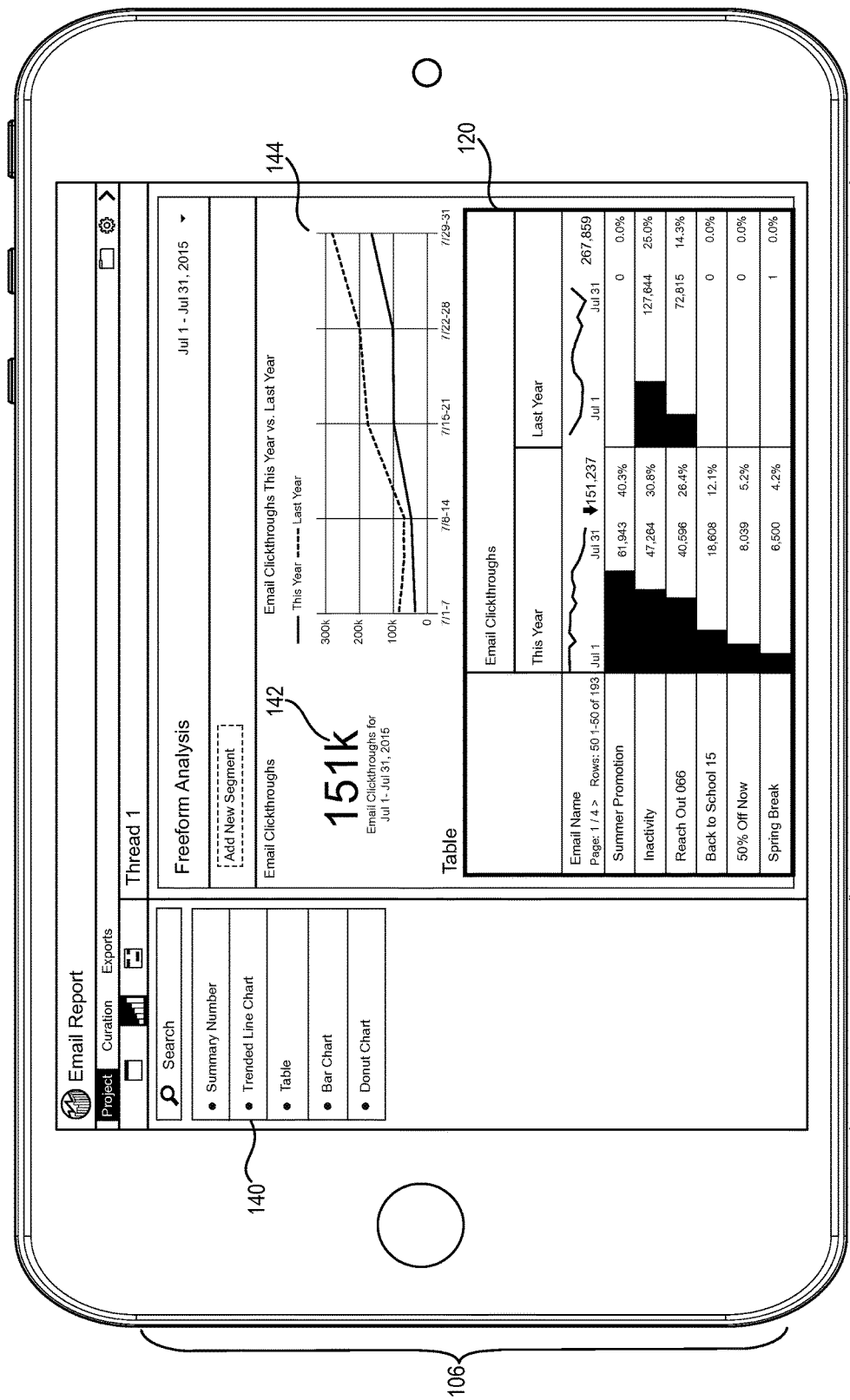

GENERATING A CURATED DIGITAL ANALYTICS WORKSPACE

BACKGROUND

1. Technical Field

One or more embodiments of the present disclosure relate generally to digital workspaces that allow for viewing, modifying, and curating of analytics data. More specifically, one or more embodiments of the present disclosure relate to systems and methods that dynamically modify a digital analytics workspace to generate a curated digital analytics workspace.

2. Background and Relevant Art

Recent years have seen a proliferation of available digital data for companies regarding their business and customers. Indeed, due to the rise of Internet advertising and sales—together with new and improved digital means of collecting, gathering, and analyzing digital data—businesses can now access a near-constant stream of digital business-related data. For example, businesses now commonly gather, collect, and access digital data regarding customer Internet activity (e.g., clicks, search terms, Internet purchases, time on a site), customer background (e.g., demographics, interests), advertisements (e.g., advertising content, clickthrough rates), web-site activity (e.g., page views, number of visitors), products, revenue, sales, downloads, orders, and other data.

Although such large amounts of data can provide various insights, businesses face new problems in seeking to analyze and utilize such a broad amount (and variety) of constantly changing digital data. Indeed, unlike standard monthly or quarterly reports from the pre-digital age, businesses now have access to volumes of digital information, in a rapidly updated digital stream. Indeed, today many companies hire teams of analysts who have the responsibility of culling and presenting data in a manner that is useful to business decision-makers.

Analysts have become quite proficient at analyzing large volumes of data and presenting the data in a fashion that other individuals in a business can understand. Although common data analytics systems allow analysts to convey information to other members of a business, they introduce their own problems. For instance, companies that utilize traditional systems often become over-reliant on analysts to manipulate and interpret digital data. Indeed, due to the complex nature of common analytics systems, the sheer volume of available data, and the numerous methods available for analyzing the data, many individuals in a business are often overwhelmed and incapable of analyzing information without the assistance of an analyst.

Accordingly, analysts are often over-taxed with data analysis responsibilities. For instance, because other business individuals are unable to manipulate data, analysts are often required to assist at almost every step of a business decision involving data analytics. For example, an analyst may be required where a business simply needs to obtain slightly modified information (e.g., where a decision-maker needs to change the beginning date or end date for the applicable data). Accordingly, analysts can expend a significant amount of time tweaking data in simple ways because other individuals in the business are incapable of doing so.

Common data analytics systems not only over-burden analysts, they tend to under-utilize the skills of employees without data analytics skills. Not surprisingly, the individuals most in-touch with the critical practices, affairs, concerns, and policies of a business are often not the analysts. Yet, because most common data analytics systems require analysts to process digital data at each stage, analysts most frequently make decision regarding what data to utilize, how to process the data, and how to provide the data. Accordingly, businesses utilizing common data analytics features frequently fail to capture the critical ideas and approaches to data-analytics that non-analyst employees can provide.

These and other problems exist with regard to digital analytics workspaces.

BRIEF SUMMARY

Embodiments of the present disclosure provide benefits and/or solve one or more of the foregoing or other problems in the art with systems and methods that generate and modify a digital analytics workspace (e.g., an workspace utilized by an analyst) to create a curated digital digital analytics workspace (e.g., a workspace utilized by a marketer, or other non-analyst). In particular, in one or more embodiments, the disclosed systems and methods create a digital analytics workspace that provides access to and allows manipulation of a set of data elements to create analytics visualizations. The systems and methods generate analytics visualizations via the digital analytics workspace using data elements from the set of data elements. Upon receiving a request to share the analytics visualizations, systems and methods generate a limited set of data elements based on the analytics visualizations. For example, in one or more embodiments, systems and methods generate the limited set of data elements based on one or more user characteristics. The systems and methods then generate a curated digital analytics workspace that includes the analytics visualizations and allows for manipulation of the analytics visualizations using the limited set of data elements. In this manner, systems and methods curate a digital analytics workspace from an existing digital analytics workspace to provide users with a workspace with information appropriate to their needs and capabilities.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features can be obtained, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, the disclosed systems and methods will be described and explained with additional specificity and detail through the use of the accompanying drawings in which:

FIG. 1C illustrates the computing device, the user interface, and the digital analytics workspace of FIG. 1A with additional analytics visualizations in accordance with one or more embodiments;

DETAILED DESCRIPTION

Figure 1A:
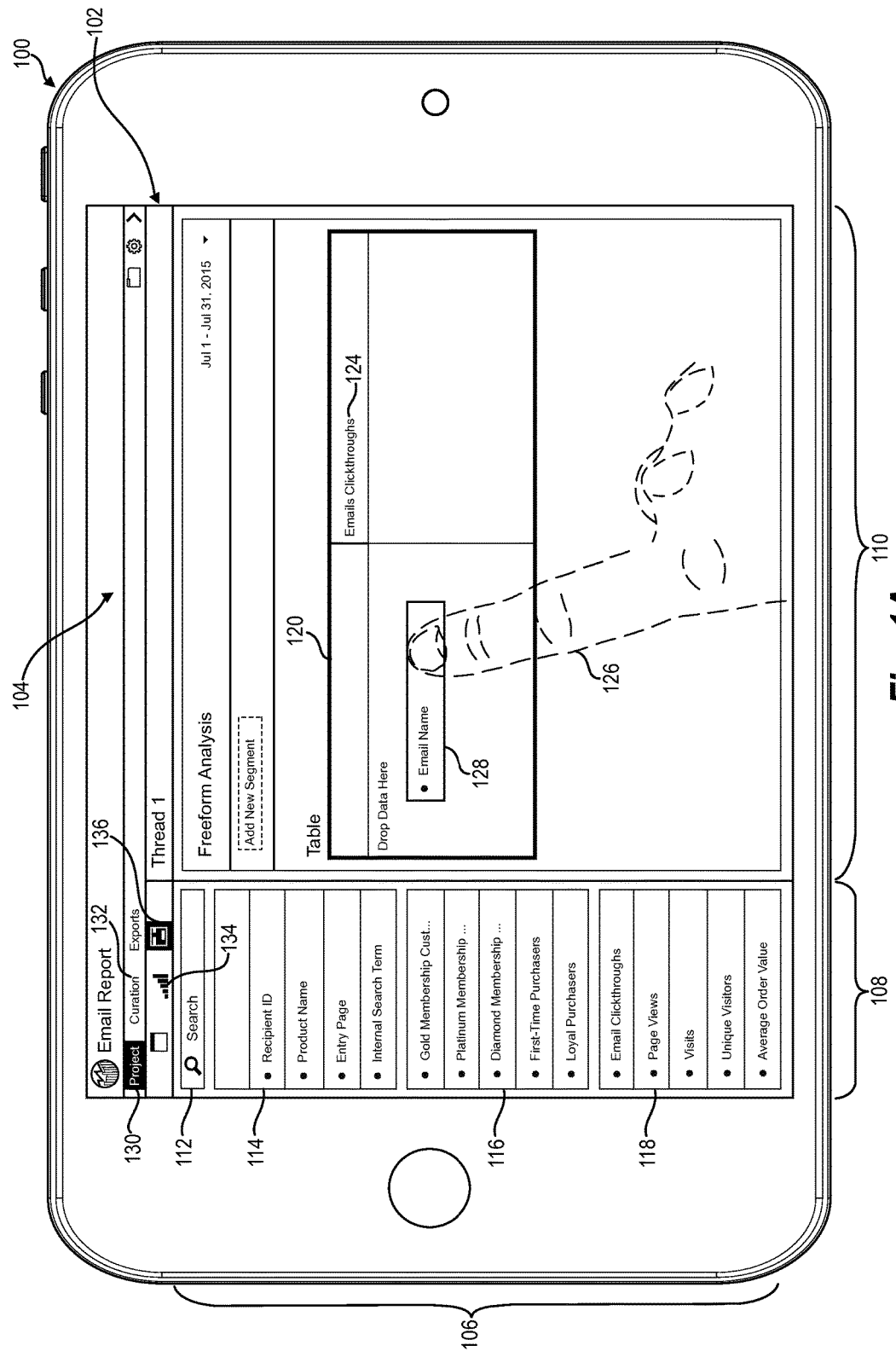
FIG. 1A illustrates a computing device displaying a user interface including a digital analytics workspace in accordance with one or more embodiments.

One or more embodiments of the present disclosure include a digital analytics workspace curation system or simply curation system. In particular, in one or more embodiments the curation system generates and modifies a digital analytics workspace to create a curated digital analytics workspace. More particularly, in one or more embodiments, the curation system provides a digital analytics workspace, provides the ability to curate (e.g., intelligently select) data elements and analytics visualizations appropriate for a business user or team, and provides a curated digital analytics workspace for the business user or team that includes the ability to analyze data elements within the bounds set for the curated digital analytics workspace. In this manner, the curation system generates a curated digital analytics workspace that provides a targeted set of data elements and analytics visualizations suited to the needs and capabilities of a user or group while also providing the user or group with the ability to dynamically analyze the data elements.

For instance, in one or more embodiments, the curation system provides a digital analytics workspace that provides access to and allows for manipulation of a set of data elements to create one or more analytics visualizations (e.g., data tables, charts, graphs, or other visualizations). The curation system then generates, based on user input received via the digital analytics workspace, analytics visualizations using the set of data elements. In one or more embodiments, the curation system receives a request to share the analytics visualizations and generates a limited set of data elements based on the generated analytics visualizations and/or other factors (e.g., user characteristics or user input). Then, the curation system generates a curated digital analytics workspace that includes the analytics visualizations, provides access to the limited set of data elements, and allows for manipulation of the one or more analytics visualizations using the limited set of data elements.

By generating a limited set of data elements for utilization in the curated digital analytics workspace, the curation system reduces the risk of confusing or overwhelming a user of the curated digital analytics workspace. For instance, the digital analytics workspace may have access to thousands of data elements and analytics visualizations that permit an analyst to freely explore analytics data. In particular, the curation system provides a digital analytics workspace that can perform various types of analysis, build highly complex queries, analyze data at a variety of levels, and utilize a wide variety of data breakdowns and comparisons. Such a large amount of data combined with such a variety of capabilities may easily overwhelm and confuse users without analytics training or experience. One or more embodiments of the curation system helps to avoid this problem by intelligently limiting data elements and/or analytics visualizations available within a curated digital analytics workspace.

Moreover, in one or more embodiments the curation system enables additional contribution from business users (including non-analysts) by providing a curated digital analytics workspace that permits a user to dynamically analyze the data. In particular, in one or more embodiments, the curation system generates a curated digital analytics workspace that permits a user to modify existing analytics visualizations, select different or additional data elements to analyze, generate new analytics visualizations, and otherwise manipulate and/or analyze data. Accordingly, the curation system generates a curated digital analytics workspace that provides a guided analysis: i.e., limits the data elements and/or analytics visualizations to avoid confusion and guide further analysis, while permitting manipulation and analysis of the pertinent data.

In one or more embodiments, the curation system identifies data elements and/or analytics visualizations for a curated digital analytics workspace based on user input (e.g., input by an analyst). For instance, the curation system can provide curating tools that allow the analyst to identify data elements and visualizations appropriate for a collaborator (e.g., a business user or team). In particular, the curating tools permit an analyst to identify data elements and visualizations targeted to the needs and capabilities of particular recipients or projects.

Moreover, to further identify and provide information targeted to the needs and abilities of a particular user (or group of users), one or more embodiments of the curation system identify and utilize characteristics related to a user (or group of users). For example, the curation system determines that a user belongs to a particular department, has a certain background or training, has previously accessed a particular type of information or data element, or has previously utilized a particular analytics visualization. Moreover, based on these user characteristics, the curation system limits data elements and/or analytics visualizations to more particularly target the curated digital analytics workspace to the needs and capabilities of a particular user or group of users. For instance, an individual in a marketing department will generally have different needs and interests with regard to data analytics than an individual in a sales department, a legal department, or a supply-chain department. The curation system can limit data elements and/or analytics visualizations based on such characteristics.

In addition to detecting and utilizing user characteristics, to assist in identifying and limiting data elements or analytics visualizations to a particular user or group of users, one or more embodiments of the curation system utilize one or more tags. As described more fully below, in one or more embodiments, the curation system applies tags to data elements and/or analytics visualizations that share common features. For example, the curation system applies tags to all data elements relating to a particular topic (e.g., website visits), individuals (e.g., data elements accessed by a particular individual), groups (e.g., data elements relating to marketing), or some other common feature. Moreover, the curation system utilizes tags to identify or search for data elements and/or analytics visualizations. For example, a user (e.g., an analyst) can search for data elements utilizing tags applied by the curation system. Similarly, the curation system can utilize tags to identify data elements or visualizations particular to an individual or group.

In one or more embodiments, the curation system further assists in identifying pertinent data elements or analytics visualizations by providing one or more suggestions. In particular, the curation system suggests one or more data elements and/or analytics visualizations (e.g., to a user of a digital analytics workspace or a curated digital analytics workspace). More specifically, the curation system can suggest one or more data elements and/or analytics visualizations based on user characteristics, data element features, analytics visualizations features, or other factors (as described in more detail below). In one or more embodiments, a user can select suggested data elements or analytics visualizations based on user input with a user interface associated with the curation system. By providing and incorporating suggestions (e.g., suggestions based on user characteristics, data elements, or analytics visualizations) the curation system can more particularly target a curated digital analytics workspace to a particular user or group.

Significantly, in one or more embodiments, the curation system operates as a web-based application. In particular, in one or more embodiments, the curation system provides the benefits and functions described herein via a web-browser connected to one or more servers via a network (i.e., the Internet). By providing a web-based curation system, rather than a local curation system application, one or more embodiments facilitate sharing data elements and/or analytics visualizations. For instance, the curation system can provide a curated digital analytics workspace even though a user has not downloaded a particular application on a local client machine devoted to the curation system.

In sum, in one or more embodiments, the curation system provides an end-to-end analytics workflow (i.e., a single platform to forage, curate, and share analytics data). The curation system can provide this functionality via a digital analytics workspace (e.g., a workspace that provides analysts with access to available data elements and analytics visualizations), a curating workspace (e.g., a digital analytics workspace that allows an analyst to apply limits and prepare data elements and/or analytics visualizations for ongoing use by other individuals or teams), and/or a curated digital analytics workspace (e.g., a workspace that allows business individuals or departments to explore data elements and/or analytics visualizations within bounds established by the curation system). Embodiments of the curation system that utilize a digital analytics workspace, curating workspace, and/or a curated digital analytics workspace are described in further detail below with regard to FIGS. 1A-1C, 2A-2E, and 3A-3E, respectively.

As used herein, the term "data element" refers to a type or a collection of digital data. The term data element may include raw data, algorithmically post-processed data, or other data. In particular, the term data element may include a collection of data related to operation of a business. A data element may include a collection of data, a subset of a larger collection of data, or a component of data related to particular customer segments, metrics, or dimensions. For instance, a data element may comprise data regarding customers, purchases, orders, revenue, sales, advertising, profits, inventory, losses, prices, website visits, click-through rates, products, accounts, billings, or other business data. Data elements may include data regarding all customers, a segment of customers (i.e., a customer segment), or individual customers. A data element may include one or more metrics (e.g., data measurements), such as page reviews, revenue, reviews, visit depth, order review, time, page views, billing info, or other metrics. Similarly, a data element may include data specific to various dimensions of a business, for example, dimensions specific to particular products, advertisements, accounts, customer search terms, departments, or other dimensions. A data element may comprise a particular subset of data related to particular customer segments, metrics, and business dimensions. For example, a data element may comprise data regarding orders received (i.e., a metric), for only new customers (i.e., a customer segment), who viewed a particular web advertisement (i.e., a dimension).

As used herein, a "dimension" is representative of a categorical variable associated with a web metric. Some examples of dimensions include a country of a visitor to the website, various demographics of the visitor, a browser type used by the visitor to access the website, an operating system used by the visitor when accessing the website, referring websites, demographic and/or geographic information about a visitor, and so on. A dimension element is representative of values associated with a corresponding dimension. For example, in the example detailed above, a dimension element associated with a new advertisement campaign can be a particular country.

As used herein, the term "analytics visualization" refers to any digital visual compilation of analytics data. In particular, an analytics visualization may comprise a digital, visual compilation of one or more data elements. For example, an analytics visualization may include a table, chart, bar chart, trended line chart, donut chart, graph, two-dimensional graph, three-dimensional graph, summary, summary number, or other digital, visual compilation of data. For example, a digital analytics workspace may include an analytics visualization comprising a trended line chart showing the sales attributable to new customers over time (e.g., per month) for the past year.

As used herein, the term "digital analytics workspace" refers to any digital environment for analyzing one or more pieces of digital data. For example, a digital analytics workspace includes a portion of a digital user interface displaying representations of data that a user can view, analyze, manipulate, or modify. In particular, a digital analytics workspace may comprise a portion of digital user interface displaying representations of one or more data elements and/or analytics visualizations.

Similarly, as used herein, the term "curated digital analytics workspace" refers to a revised digital analytics workspace. In particular, the curated digital analytics workspace includes a revised digital analytics workspace that provides access to a limited set of data elements, analytics visualizations, capabilities and/or other features. More specifically, a curated digital analytics workspace includes a digital analytics workspace that provides access to fewer data elements and/or analytics visualizations.

As used herein, a network application refers to computer software that causes one or more computing devices to perform useful tasks and that is supported by or uses a network (e.g., the Internet) to preform a portion of the useful tasks. Examples of network applications include websites, desktop computing applications (e.g., native applications for personal computers or laptops), and mobile applications (e.g., native applications for phones and tablets).

Figure 1B:
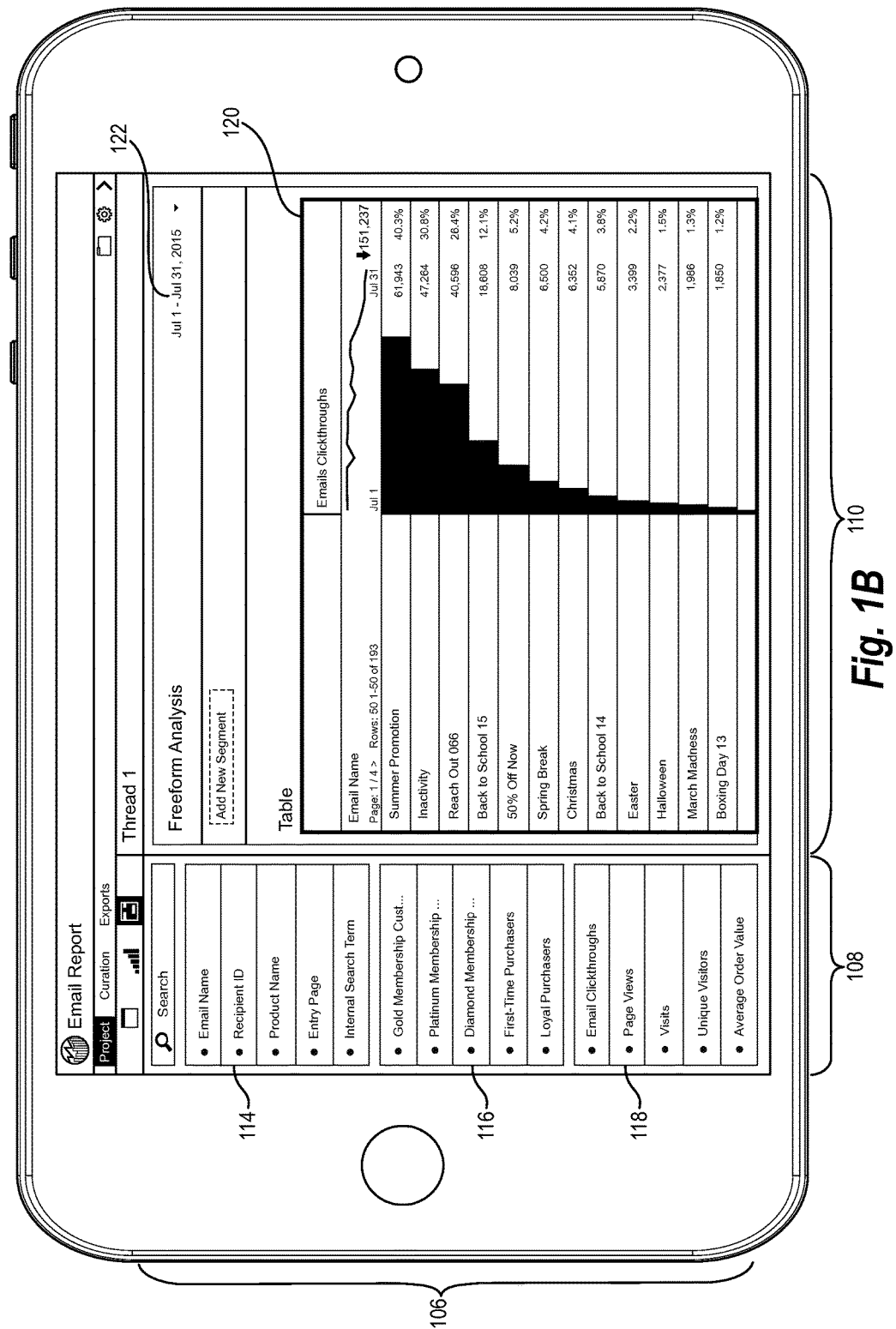
FIG. 1B illustrates the computing device, the user interface, and the digital analytics workspace of FIG. 1A with an analytics visualization generated from data elements in accordance with one or more embodiments.

Turning now to FIGS. 1A-1C, additional detail will be provided regarding features and capabilities of the curation system and one or more digital analytics workspaces. In particular, FIG. 1A illustrates a computing device 100 operatively coupled to a touch screen 102 showing a user interface 104 in accordance with one or more embodiments of the curation system. In particular, the user interface 104 includes a digital analytics workspace 106, a project tab 130, a curation tab 132, an analytics visualization tab 134, and a data elements tab 136. Although the computing device 100 is represented in FIG. 1A as a tablet with a touch screen, it will be appreciated that the computing device 100 may comprise any type of computing device and/or display device, including those described below with regard to FIG. 7. Moreover, regardless of the particular elements shown in FIG. 1A, the user interface 104 may provide additional, fewer, or alternative elements to accomplish the functions described herein.

The project tab 130, the curation tab 132, the analytics visualization tab 134, and the data elements tab 136 are user interface elements that provide access to various functions or features of the curation system. User interaction with each element causes the curation system to provide access to various functions and features. In particular, the project tab 130 provides access to a variety of tools to create a digital analytics workspace comprising one or more analytics visualizations; the curation tab 132 provides access to a variety of tools to curate a digital analytics workspace; the analytics visualizations tab 134 provides access to a variety of analytics visualizations; and the data elements tab 136 provides access to a variety of data elements.

As illustrated in FIG. 1A, the project tab 130 and the data elements tab 136 are selected; accordingly, the curation system provides access to various tools for creating a digital analytics workspace utilizing one or more data elements. In particular, the curation system provides the digital analytics workspace 106. The digital analytics workspace 106 provides access to a variety of data elements. Moreover, the digital analytics workspace allows for creation, modification, or removal of one or more analytics visualizations.

In particular, the digital analytics workspace 106 includes a components display area 108. As shown, the components display area 108 includes a variety of data element representations. Specifically, in the particular embodiment shown in FIG. 1A, the components display area 108 includes three groups of representations: representations for dimensions 114, customer segments 116, and metrics 118. Each group contains representations of individual data elements; for example, the metrics 118 include representations for data elements related to "Email Clickthroughs," "Page Views," "Visits," "Unique Visitors," and "Average Order Value."

In addition, the components display area 108 includes a search bar 112. The search bar 112 can receive user input of one or more search terms. In response to user interaction with the search bar 112, the curation system can search data elements based on one or more search terms and provide search results. Given that some embodiments of the curation system can include thousands of data elements (or more), the search bar 112 provides a simple means to identify pertinent data elements.

As illustrated in FIG. 1A, the digital analytics workspace 106 also includes a data analysis display area 110. The data analysis display area 110 may include one or more analytics visualizations. In particular, as shown, the data analysis display area 110 includes a table 120. The table 120 is an analytics visualization capable of displaying a compilation of data. Specifically, the table 120 can display a visual representation of data from one or more data elements (e.g., data elements represented by the dimensions 114, the customer segments 116, and the metrics 118). As shown, the table 120 does not display a compilation of data, as the table 120 has not received sufficient data to provide a visual analysis.

Indeed, in one or more embodiments, the digital analytics workspace 106 permits a user to create or modify analytics visualizations based on user interaction with one or more data elements. Specifically, the components display area 108 includes one or more data elements representations for creating or modifying analytic visualizations. A user can interact with representations of data elements from the components display area 108 to generate or modify one or more analytics visualizations, including the table 120. For instance, as shown, a user can interact with the digital analytics workspace 106 utilizing an input device 126 (e.g., a finger). In particular, a user can initiate a press or select event with regard to a data element representation (e.g., press on the touch screen 102); initiate a move event with regard to the data element representation (e.g., continue pressing on the touch screen 102 while moving the input device 126 along the touch screen 102); and initiate a release event with regard to the data element representation (e.g., lift the input device 126 from the touch screen 102). In this manner (i.e., a "drag and drop" action), a user can manipulate one or more data elements with regard to one or more analytics visualizations.

Thus, as shown in FIG. 1A, a user can select and move an email name data element representation 128, from the components display area 108 to the data analysis display area 110. In particular, a user can drag the email name data element representation 128 to the table 120 and drop the email name data element representation 128 within a designated area of the table 120. In response, the curation system adjusts the table 120 to provide further analysis with regard to email name data element representation 128. In particular, because the table 120 already includes email clickthroughs data element representation 124, the curation system adjusts the table 120 to analyze a data element related to "Email Clickthroughs" in light of a data element related to "Email name."

For example, FIG. 1B illustrates the digital analytics workspace 106 displaying the table 120, as modified, including an analysis of data elements related to "Email Clickthroughs" and "Email Name." As just discussed, in one or more embodiments, the curation system provides the table 120, as modified in FIG. 1B, in response to a user dragging and dropping the email name data element representation 128 and email clickthrough data element representation 124 from the components display area 108 to the table 120 in the data analysis display area 110.

As illustrated in FIG. 1B, the table 120 now provides a variety of visual compilations of data. For instance, the table 120 displays email clickthrough data (e.g., number and percentage of clickthroughs) for various advertising e-mail promotions from Jul. 1 to Jul. 31, 2015, including, e-mail promotions named "Summer Promotion"; "Inactivity"; "Reach out 066"; "Back to School 15"; "50% Off Now"; etc. The table 120 also includes a graph of total e-mail clickthroughs from Jul. 1 to Jul. 31, 2015, together with the total number of clickthroughs for that time period (i.e., 151,237 clickthroughs). The table 120 also includes a bar next to each e-mail name representing a number of clickthroughs attributable to each e-mail. The digital analytics workspace 106 can provide a variety of additional or alternative visual representations with regard to the table 120 and can provide a variety of alternate or additional visual representations.

The curation system can further modify analytics visualizations to provide additional analytics capabilities. For example, as illustrated in FIG. 1B, the data analysis display area 110 may include a date element 122. A user can interact with the date element 122 to modify one or more date parameters applicable to data elements utilized in one or more analytics visualizations. For example, as illustrated, the date element 122 applies a date parameter of Jul. 1, 2015 to Jul. 31, 2015. Accordingly, as shown, the curation system limits the table 120 to dates of Jul. 1, 2015 to Jul. 31, 2015. The curation system can modify applicable date parameters to one or more data elements and/or one or more analytics visualizations (e.g., change the dates applicable to data elements utilized in the table 120 to Dec. 1, 2015 to Jul. 31, 2015).

The curation system provides a wide variety of analytics visualizations based on analysis of a wide variety of data elements. For example, FIG. 1C illustrates the digital analytics workspace 106 upon selection of the analytics visualization tab 134 (see FIG. 1A). The digital analytics workspace 106 now provides analytics visualizations representations 140 in the components display area 108. The analytics visualizations representations 140 include representations of available analytics visualizations, such as "Summary Number," "Trended Line Chart," "Table," "Bar Chart," and "Donut Chart." Although FIG. 1C illustrates an exemplary list of analytics visualizations in accordance with one or more embodiments, it will be appreciated that the curation system may provide any number or variety of analytics visualizations.

Upon user interaction with one or more of the analytics visualizations representations 140 (e.g., dragging and dropping representations from the components display area 108 to the data analysis display area 110), in one or more embodiments the curation system can add analytics visualizations to the digital analytics workspace 106. Thus, for example, FIG. 1C illustrates two additional analytics visualizations in the data analysis display area 110: specifically, a summary number visualization 142 and a trended line chart 144. The summary number visualization 142 is an analytics visualization showing the total e-mail clickthroughs for Jul. 1, 2015 through Jul. 31, 2015. With regard to FIG. 1C, the curation system generates the summary number visualization 142 based on user interaction with the "Summary Number" representation from the analytics visualizations representations 140 (e.g., dragging and dropping the representation from the components display area 108 to the data analysis display area 110) and user interaction with the "Email clickthroughs" representation from the metrics 118 (e.g., dragging and dropping the representation from the analytics visualization representations 140 to the data analysis display area 110).

Similarly, the trended line chart 144 provides a line chart comparing email clickthroughs per week for the months of July 2014 and July 2015. For purposes of the exemplary embodiment of FIG. 1C, the curation system generates the trended line chart 144 in response to user interaction with the "Trended Line Chart" representation from the analytics visualization representations 140 and user interaction with both email clickthroughs data element representation 124 and a data element representation labeled "Email Clickthroughs Previous Year" (not shown but available via user interaction with the search bar 112).

The curation system can also modify one or more analytics visualizations based on additional user interaction with one or more data element representations. For instance, FIG. 1C displays the table 120 upon a user providing additional user interaction with regard to one or more additional data element representations. Specifically, the curation system modifies the table 120 as shown in FIG. 1C based upon a user interaction (e.g., a drag and drop) with a data element representation with regard to email clickthroughs for the previous year. For example, upon a user dragging a data element representation for clickthroughs for the previous year from the components display area 108 to the table 120 in the data analysis display area 110, the curation system can modify the table 120 to include analysis of email clickthroughs from the previous year in addition to analysis of email clickthroughs for the current year.

Although FIGS. 1A-1C illustrate analytics visualizations with regard to email clickthroughs for the current and/or previous year, the curation system can analyze and provide analytics visualizations with regard to any number or type of data elements (in isolation or in combination). For example, the curation system can modify analytics visualizations to show data specific to additional metrics with regard to particular customer segments, particular dimensions, or some other type of data element. For example, based upon user interaction with additional data element representations (e.g., dragging and dropping) the curation system can modify the table 120 to show: orders resulting from specific e-mails; email clickthroughs particular to specific products; the number of email clickthroughs for new customers with regard to each email name; the amount of revenue received from platinum member customers from each e-mail name; or some other analysis based on a different combination of data elements. Thus, the curation system provides a digital analytics workspace where a user (e.g., an analyst) is free to explore the data, build highly complex queries and analyses going several levels deep into the data (e.g., utilizing several different data elements and analytics methods) and utilizing a variety of breakdowns and comparisons.

Moreover, the curation system allows a user to perform any type of analysis utilizing the digital analytics workspace 106. For example, in addition to the analysis described above, in one or more embodiments the curation system can perform freeform "pivot-table" analysis, contribution analysis, anomaly detection, clustering, auto-segmentation, path fallout/flow, or any other type of data science or analysis exploration. Thus, the curation system provides thousands of data elements together with the capability to manipulate those data elements utilizing a variety of analytics visualizations and analysis methods. Specifically, an analyst can forage through and dynamically analyze the data elements utilizing simple drag and drop or other interactions to generate a digital analytics workspace that analyzes the data elements in any number of ways.

As discussed above, however, non-analysts (e.g., marketers, editors, or others) are often overwhelmed by the volume of data elements and analytics possibilities available within a digital analytics workspace such as the digital analytics workspace 106. Accordingly, in one or more embodiments, the curation system modifies a digital analytics workspace to generate a curated digital analytics workspace. In particular, the curation system provides curation tools to intelligently apply guiding boundaries to a digital analytics workspace for particular recipients, users, or collaborators.

Figure 2A:
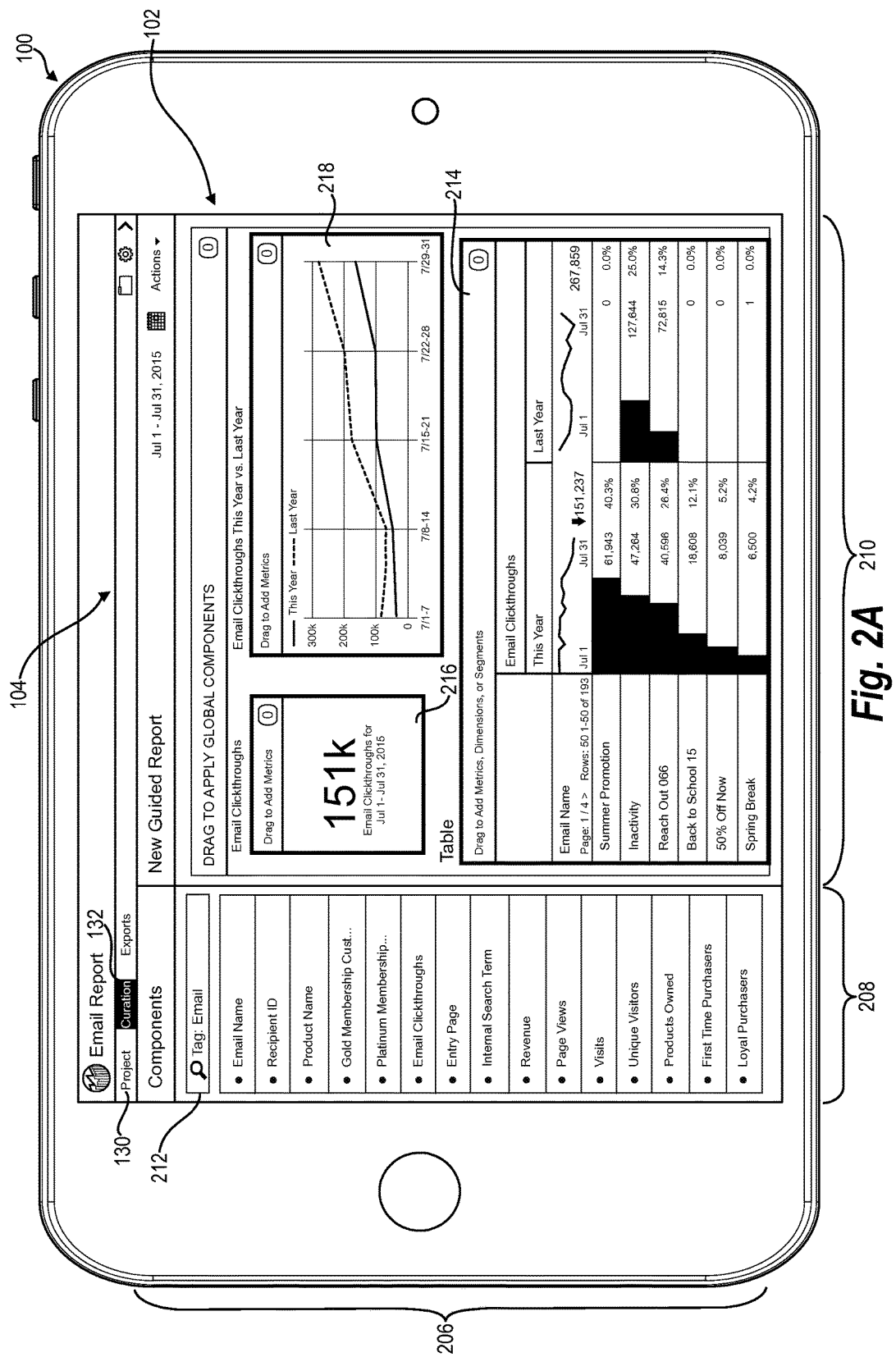
FIG. 2A illustrates the computing device, the user interface, and the digital analytics workspace of FIG. 1A with curation tools in accordance with one or more embodiments.

In particular, FIGS. 2A-2E illustrate curating a digital analytics workspace in accordance with one or more embodiments. For example, in one or more embodiments, an analyst utilizes curating tools to identify a subset of data elements and/or analytics visualizations to share with one or more business users. Specifically, FIG. 2A illustrates the computing device 100 displaying a curating workspace 206 via the user interface 104 shown on the touch screen 102. The curating workspace 206 includes a curating components display area 208 and a curating data analysis display area 210. In one or more embodiments, the curation system displays the curating workspace 206 upon selection of the curation tab 132.

For example, in one or more embodiments, upon selection of the curation tab 132, the curation system generates a curating workspace that contains the analytics visualizations from an existing digital analytics workspace. Thus, with regard to the exemplary embodiment of FIG. 2A, the curation system generates the curating workspace 206 based on the analytics visualizations of FIG. 1C (i.e., based on the table 120, the summary number visualization 142, the trended line chart 144, and their corresponding data elements). Specifically, the curating data analysis display area 210 includes a curating table 214, a curating summary number 216, and a curating trended line chart 218, each corresponding to the table 120, the summary number visualization 142, and the trended line chart 144, respectively.

Moreover, as mentioned previously, in one or more embodiments, the curation system applies one or more tags to data elements. Tags assist in identifying pertinent data elements. For example, as shown in FIG. 2A, the curation system conducts a search for data elements based on one or more tags. Specifically, a user can provide one or more tag search terms by interacting with a search bar 212, as shown (e.g., entering "Tag: Email" in the search bar 212). With regard to the embodiment of FIG. 2A, the curation system performs a search for all data elements with the tag "email." The search returns fifteen data elements in the curating components display area 208, including "Email name," "Recipient ID," "Product Name," and other data elements related to email.

The curation system applies tags based on a variety of factors. In particular, the curation system applies one or more tags to a data element (and/or analytics visualization) based on user input, data type, a topic associated with the data, data source, data usage, or other factors. For example, an analyst can manually apply an "email" tag to an "Email Name" data element (or any of the fifteen data elements displayed in FIG. 2A) to easily locate the data element in preparing analytics visualizations for an email marketing group.

Alternatively or additionally, the curation system automatically applies an "email" tag by determining that the data includes email titles (e.g., based on data type). Similarly, the curation system automatically applies a "marketing" tag by determining that "Email Name" is a topic related to e-mail marketing (e.g., based on a topic associated with the data). Moreover, the curation system automatically applies a "marketing" tag because "Email Name" is a data element often utilized by marketing (e.g., based on data usage). Furthermore, the curation system automatically applies a marketing tag because "Email Name" data is often provided by the marketing group to the curation system (e.g., based on data source).

Although FIG. 2A illustrates fifteen data elements returned in response to a search for data elements with regard to "Tag: Email," in other embodiments, the curation system applies and searches for tags with regard to a variety of other topics, issues, groups, individuals, or other categories. For example, the curation system applies tags to data elements that relate to one or more groups (e.g., marketing tags or sales tags). Similarly, the curation system can apply tags to data elements that relate to one or more topics (e.g., internet sales, promotions, or inventory) or individuals (e.g., VP of Marketing data elements). For instance, the curation system can apply one or more tags based on user input via add tag element 242 of FIG. 2E.

The curation system can conduct a search for tags at any time. Thus, although FIG. 2A illustrates a search via the search bar 212 in the curating workspace 206 after certain analytics visualizations have been created, in one or more embodiments, the curation system searches via the search bar 112 in the digital analytics workspace 106 before creation of analytics visualizations, after the creation of analytics visualizations but before curating a digital analytics workspace, or at some other time.

Moreover, it will be appreciated that although the table 120, the summary number visualization 142, and the trended line chart 144 of FIG. 1C correspond to the curating table 214, the curating summary number 216, and the curating trended line chart 218 of FIG. 2A, in one or more embodiments, the curation system modifies analytics visualizations from the digital analytics workspace 106 in creating the curating workspace 206. For example, in one or more embodiments the curation system permits a user (e.g., an analyst) to select one or more analytics visualizations from the digital analytics workspace 106 to exclude (or include) in providing the curating workspace 206. Specifically, in one or more other embodiments, the curation system generates the curating workspace 206 without the table 120 or another analytics visualization contained in the digital analytics workspace 106.

As discussed previously, the curation system curates a digital analytics workspace by limiting data elements and/or analytics visualizations. For example, in one or more embodiments an analyst selects a limited set of data elements to provide to other business users. Accordingly, FIG. 2B illustrates an exemplary embodiment of selecting, identifying, and or limiting data elements and/or analytics visualizations.

Figure 2B:
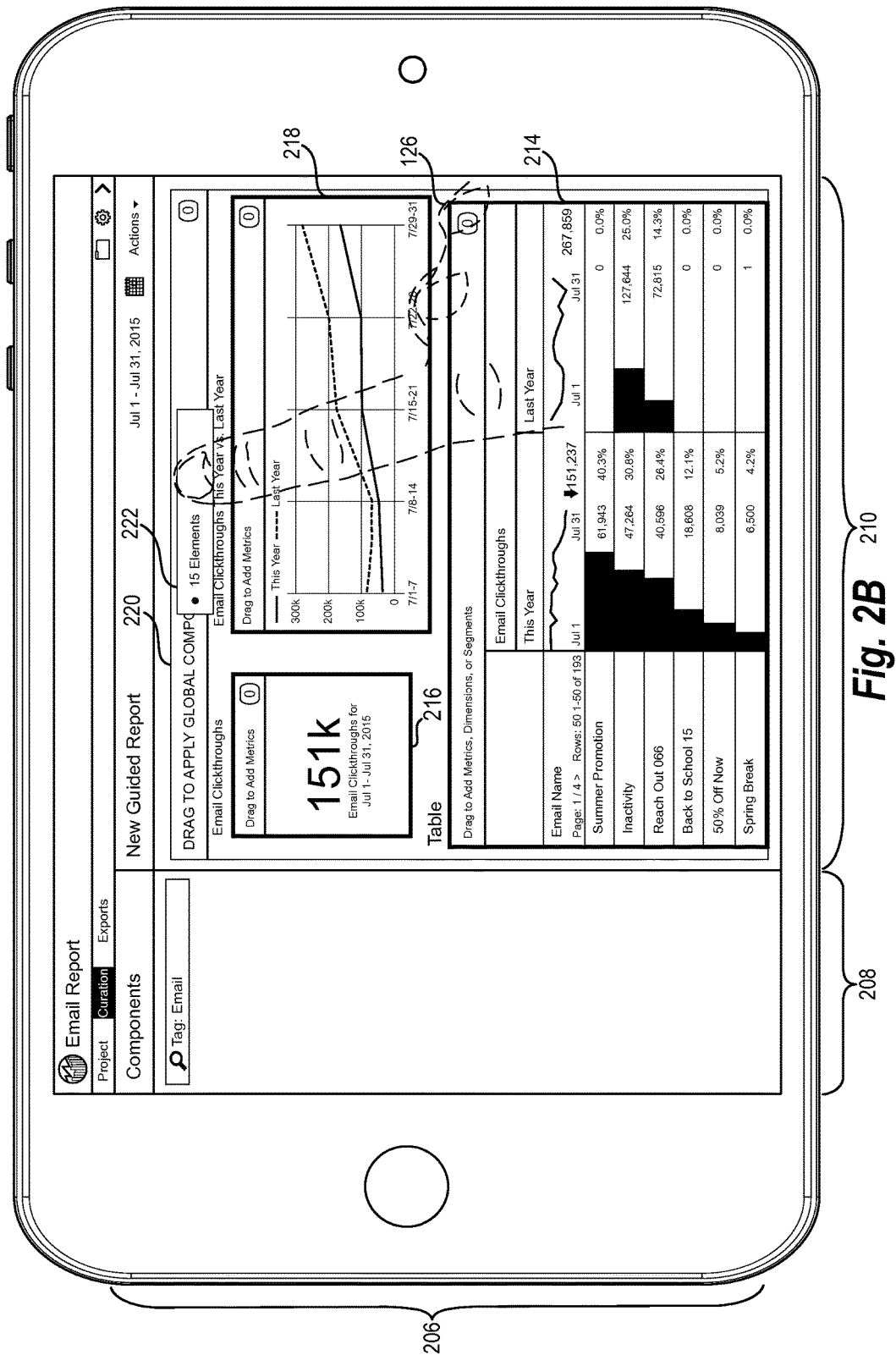
FIG. 2B illustrates the computing device and user interface of FIG. 2A illustrating the selection of a subset of data elements for use with a curated digital analytics workspace in accordance with one or more embodiments.

As shown in FIG. 2B, the curation system identifies data elements and/or analytics visualizations to provide in a curated digital analytics workspace via user interaction with the curating workspace 206. In particular, FIG. 2B illustrates the curating workspace 206, which includes a global application bar 220. The global application bar 220, as shown, provides a means for associating data elements to one or more analytics visualizations in the curating data analysis display area 210.

For example, as shown in FIG. 2B, the input device 126 interacts with the touch screen 102 to initiate a select event and drag event in relation to the fifteen data elements shown in the curating components display area 208 of FIG. 2A. In the exemplary embodiment of FIG. 2B, the curation system provides a combined data element representation 222 corresponding to the fifteen data elements previously shown in the curating components display area 208 of FIG. 2A. A user (e.g., an analyst) can drag and drop the combined data element representation 222 with regard to the global application bar 220. In response, the curation system applies one or more of the data elements represented in the combined data element representation 222 to the curating table 214, the curating summary number 216, and/or the curating trended line chart 218. In one or more embodiments, the curation system associates a data element will all analytics visualizations when a user drags and drops the data element to the global application bar 220 (e.g., associate fifteen data elements corresponding to the combined data element representation 222 with the curating table 214, the curating summary number 216, and the curating trended line chart 218).

Although FIG. 2B illustrates application of a group of fifteen data elements represented by the combined data element representation 222, in other embodiments, the curation system applies fewer or additional data elements to one or more analytics representations. For example, a user can drag and drop a single data element from the curating components display area 208 to the global application bar 220, and associate the single data element to one or more analytics visualizations. Additionally, or alternatively, a user can select greater than fifteen elements to associate with one or more analytics visualizations.

Moreover, although FIG. 2A illustrates a user interaction with the global application bar 220 to associate data elements to analytics visualizations, in one or more embodiments, the curation system associates data elements with analytics visualizations by other means. For instance, in one or more embodiments, the curation system associates a data element to an analytics visualization in response to a user dragging and dropping the data element from the curating components display area 208 to an analytics visualization (e.g., the curating table 214).

Similarly, rather than associating a data element with all (or multiple) analytics visualizations, in one or more embodiments the curation system associates a data element with only a single analytics visualization. For example, the curation system applies a data element to a single analytics visualization when a user drags and drops a data element to a single analytics visualization. Thus, for instance, if the data element for "page views" is only pertinent to a single analytics visualization (e.g., the curating summary number 216) the curation system associates the data element for "page views" with only the single analytics visualization.

Figure 2C:
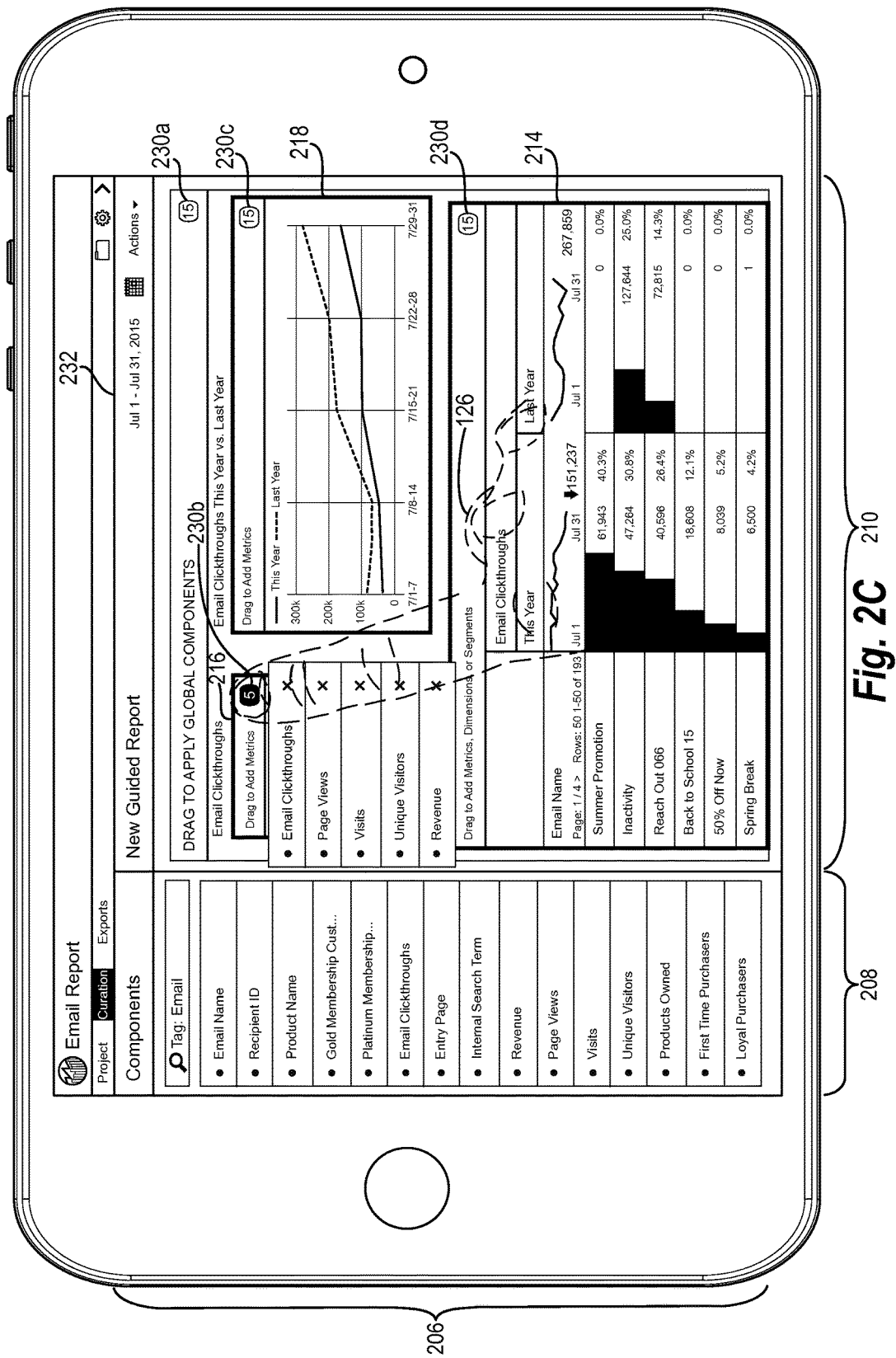
FIG. 2C illustrates the computing device and user interface of FIG. 2A during curation of the digital analytics workspace in accordance with one or more embodiments.

As just mentioned, the curation system can associate data elements with one or more analytics visualizations. FIG. 2C illustrates the curating workspace 206 after the curation system has associated data elements (e.g., data elements corresponding to the combined data element representation 222) with the curating table 214, the curating summary number 216, and the curating trended line chart 218. Specifically, the data element indicators 230a-230d illustrate the number data elements currently associated with each analytics visualization (e.g., data element indicator 230d indicates that fifteen data elements are associated with the curating table 214).

In one or more embodiments, the curation system limits the data elements that may be associated with one or more analytics visualizations. For example, one or more analytics visualizations may not be suited to analyze one or more data elements. Specifically, in one or more embodiments the summary number visualization 142 corresponding to the curating summary number 216 is only enabled to report a summary number of metrics for a defined time period, and is not enabled to analyze the data by customer segments or dimensions. Accordingly, as shown, the curation system has associated five data elements (i.e., data element indicator 230b indicates five associated data elements) with the curating summary number 216 rather than fifteen.

The curation system can further limit data elements to particular analytics visualizations. For example, as shown in FIG. 2A, the curation system modifies one or more data elements associated with an analytics visualization based on user interaction with the analytics visualization. In particular, the input device 126 can initiate a select event with regard to a data element indicator (e.g., the data element indicator 230b) and select one or more data elements to disassociate from an analytics visualization (e.g., the curating summary number 216). Thus, as shown, a user can disassociate "Email Clickthroughs," "Page Views," "Visits," etc. from the data elements associated with the curating summary number 216 by selecting an "X" next to one or more data element representations.

The curation system can also disassociate data elements that were previously associated with a plurality of analytic visualizations via the global application bar 220. For instance, based on user interaction with data element indicator 230a, the curation system provides a list of the fifteen data elements associated with analytics visualizations via the global application bar 220. Moreover, the curation system can remove any of the analytics visualizations (e.g., via user input with the data element indicator 230a) previously associated with analytics visualizations via the global application bar 220. Upon removal of one or more data elements based on interaction with the global application bar 220, in one or more embodiments the curation system disassociates the one or more data elements from all analytics visualizations.

In addition to associating, adding, removing, or disassociating data elements with regard to one or more analytics visualizations, the curation system can also modify data elements and/or analytics visualizations. For instance, as shown in FIG. 2C, the curating workspace also includes date curation element 232. The date curation element 232 permits modification of date parameters applicable to one or more data elements and/or one or more analytics visualizations. For example, based on user interaction with the date curation element 232, the curation system can limit one or more data elements to particular dates (e.g., Jul. 1, 2015 to Jul. 31, 2015). Similarly, based on user interaction with the date curation element 232, the curation system can limit one or more analytics visualizations to analysis of particular dates. The curation system can apply different date parameters to individual data elements and/or individual analytics visualizations. Thus, the curation system can limit a first analytics visualization to a first set of date parameters and limit a second analytics visualization to a second set of date parameters.

Figure 2D:
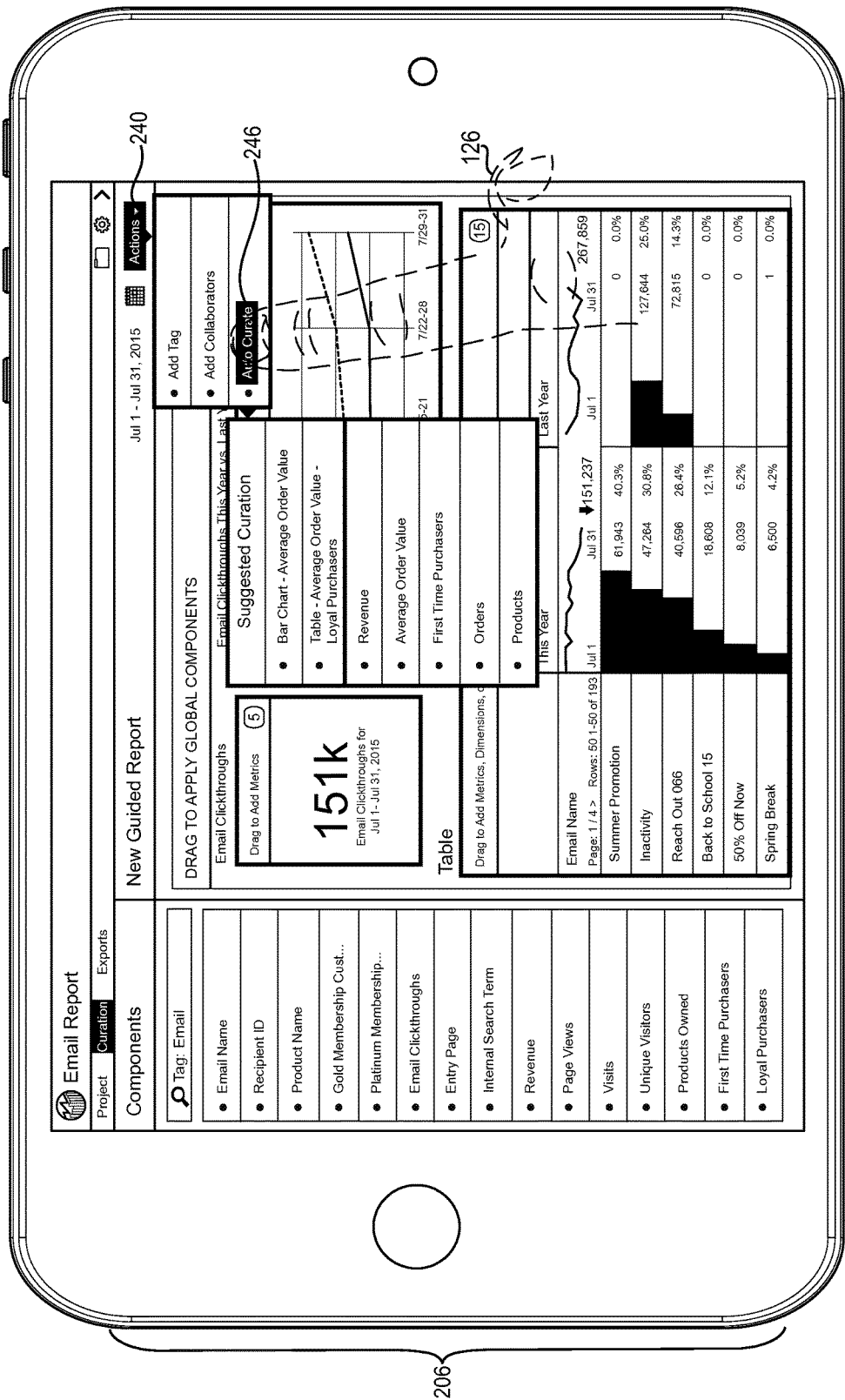
FIG. 2D illustrates the computing device and user interface of FIG. 2A together with suggested curations in accordance with one or more embodiments.

Aside from modifying parameters applicable to one or more analytics visualizations, the curation system can also suggest one or more data elements and/or analytics visualizations. In particular, with regard to FIG. 2D, the curating workspace 206 includes an action element 240. In one or more embodiments, upon user interaction with the action element 240 (or some other element) the curation system presents a menu containing an auto curate element 246. Upon user interaction with the auto curate element 246 (e.g., the input device 126 selecting the auto curate element 246), the curation system provides one or more suggestions. Thus, as illustrated in FIG. 2D, the curation system provides suggestions with regard to possible analytics visualizations (e.g., "Bar Chart") and data elements (e.g., "Revenue").

In one or more embodiments the curation system provides suggestions based on one or more user characteristics. As used herein, the phrase "user characteristics" (or "characteristics related to a user") refers to any attribute related to an individual or group. For example, user characteristics may include an individual's job title, job responsibilities, experience, training, department, or education. The term user characteristics may also include conduct or activities performed (or not performed) by an individual or group. For instance, user characteristics may comprise usage history, usage patterns, data elements utilized, data elements ignored, analytics visualizations utilized, analytics visualizations ignored, reports created, projects assigned, projects completed, or other conduct or activities. Moreover, user characteristics may include information regarding an individual's group or department. For instance, data elements utilized by a department, analytics visualizations utilized by a department, department responsibilities, department analytics training, or other information.

Accordingly, the curation system optionally utilizes any variety of user characteristics (in isolation or in combination) to suggest one or more data elements and/or analytics visualizations. For instance, with regard to FIG. 2D, the curation system suggests the analytics visualization "Bar Chart—Average Order Value," (or any other analytics visualization or data element) based on: a determination that a user (e.g., a collaborator) is in a marketing department; a determination that a user (e.g., a collaborator) previously utilized a data element relating to average order value in the past; a determination that an analyst previously provided a bar chart containing an average order value for another user; a determination that a collaborator has a marketing degree; a determination that a collaborator is a Marketing Supervisor; a determination that a collaborator has a responsibility to prepare suggestions regarding order values; a determination that a marketing department utilizes a bar chart of average order value in weekly meetings; or some other determination, usage pattern, characteristic, or information.

In addition to user characteristics, the curation system can also suggest data elements and/or analytics visualizations based on features of one or more data elements. For example, in one or more embodiments, the curation system analyzes one or more data elements and identifies trends, anomalies, changes, outliers, or other features. The curation system also suggests data elements or analytics visualizations that would illustrate the identified trends, anomalies, changes, outliers, or other features. For example, with regard to FIG. 2D, the curation system may determine that the average order value for loyal purchasers increased by more than 50% in the past month. Based on the determination, the curation system can suggest "Table—Average Order Value—Loyal Purchasers" to illustrate the noteworthy trend in the data.

Similarly, in one or more embodiments, the curation system suggests data elements and/or analytics visualizations based on data elements already selected. For instance, the curation system determines that the curating workspace 206 contains data elements related to e-mail and marketing. Accordingly, the curation system suggests additional data elements based on that determination, such as "products," or other data elements related to e-mail marketing.

Moreover, the curation system optionally suggests data elements and/or analytics visualizations based on a user interaction with one or more suggestions. For instance, the curation system determines that a user has viewed but not selected a suggested data element, and based on that determination, no longer suggested the data element. Moreover, the curation system determines that a user routinely selects suggestions of a particular type, kind, topic, or interest and suggests similar data elements or analytics visualizations.

In addition, the curation system, in one or more embodiments, suggests data elements and/or analytics visualizations by comparing user characteristics of two or more individuals. For instance, the curation system determines a first set of user characteristics related to a first user. The curation system also determines a second set of user characteristics related to a second user and a particular data element and/or analytics visualization utilized by the second user. The curation system compares the first set of user characteristics and the second set of characteristics and determine a correspondence between the first set of user characteristics and the second set of user characteristics. Based on the comparison and/or the determined correspondence, the curation system suggests the particular data element and/or analytics visualization (e.g., suggest the particular data element for the first user).

More specifically, the curation system determines that a First Marketing Supervisor routinely utilizes a table comparing orders for the current month and the previous month. The curation system determines that a Second Marketing Supervisor shares the same job title and responsibilities as the First Marketing Supervisor. Based on that determination, the curation system suggests a table comparing orders for the current month and the previous month to an analyst utilizing the curating workspace 206 in preparing a curated digital analytics workspace for the Second Marketing Supervisor.

The curation system generates suggestions utilizing a variety of approaches and algorithms. For example, in one or more embodiments the curation system utilizes machine learning techniques to identify suggestions based on the data elements and/or analytics visualizations previously selected or utilized (e.g., data elements and/or analytics visualizations selected by an analyst). Thus, as a user continues to select or utilize data elements and/or analytics visualizations, the machine learning algorithm determines data elements and/or analytics visualizations that a user is likely to desire, and suggests data elements and/or analytics visualizations based on that determination.

Similarly, in other embodiments the curation system utilizes one or more policies in conjunction with one or more look-up tables to generate suggestions. In particular, in one or more embodiments, the curation system includes policies linking certain suggestions to one or more triggering events. The curation system collects and utilizes data regarding users in look-up tables to identify when the triggering events occur. For example, the curation system can define a policy that suggests an analytics visualization where a user has accessed the analytics visualization three times. The curation system can maintain a look-up table that tracks the number of times a user accesses any particular analytics visualizations. Upon determining, from the look-up table, that the user has accessed the analytics visualization three times, the curation system can suggest the analytics visualization.

In addition, in other embodiments the curation system utilizes an intersection algorithm to determine one or more suggestions. For instance, the curation system utilizes an intersection algorithm to determine data elements and/or analytics visualizations commonly utilized by a group of individuals. For instance, an intersection algorithm analyzes the data elements utilized by the members of a group and identify the most common data elements utilized by the members of the group. The curation system, in one or more embodiments, suggests data elements based on the identified most common data elements utilized by the members of the group.

Similarly, in one or more embodiments the curation system utilizes a union algorithm to determine one or more suggestions. For instance, the curation system utilizes a union algorithm to combine the data elements and/or analytics utilized by a user or group of users. The curation system suggests data elements based on the combined data elements and/or analytics utilized by a user or group of users.

The curation system can include one or more suggested data elements and/or analytics suggestions in the curating workspace 206. For instance, in one or more embodiments, the curation system adds a suggested data element and/or analytics suggestion based on user interaction with the suggestion. For instance, a user (e.g., analyst) can drag and drop a suggestion into the curating workspace 206. More specifically, a user can drag and drop a data element to an existing analytics visualization (e.g., the curating table 214), drag and drop an analytics visualization into an open area of the curating workspace 206, or provide some other user interaction.

Although displayed in FIG. 2D with regard to the auto curate element 246, the curation system can provide suggestions at any time or in response to any event, with or without the existence of a dedicated element. For example, the curation system can provide suggestions when a user is utilizing the digital analytics workspace 106, upon user interaction with the curation tab 132, when a user selects of one or more collaborators, upon generation of a curating workspace, upon creation of an analytics visualization, or at any other time (or in response to any other event). Similarly, as discussed further below, the curation system can provide suggestions at any time with regard to a curated workspace as well.

As mentioned previously, the curation system also shares one or more analytics visualizations and/or data elements with another user. For example, the curation system generates a curated digital analytics workspace for utilization by business users based on the data elements and/or analytics visualizations selected via the curating workspace. Accordingly, FIG. 2E illustrates identifying or selecting one or more collaborators (e.g., recipients of a limited set of data elements and/or analytics visualizations) in accordance with one or more embodiments.

In particular, as illustrated, upon user interaction with the action element 240 the curation system presents a menu containing a collaborators element 244. Upon user interaction with the collaborators element 244, the curation system provides one or more options for sharing data elements and/or analytics visualizations with one or more users or groups.

Figure 2E:
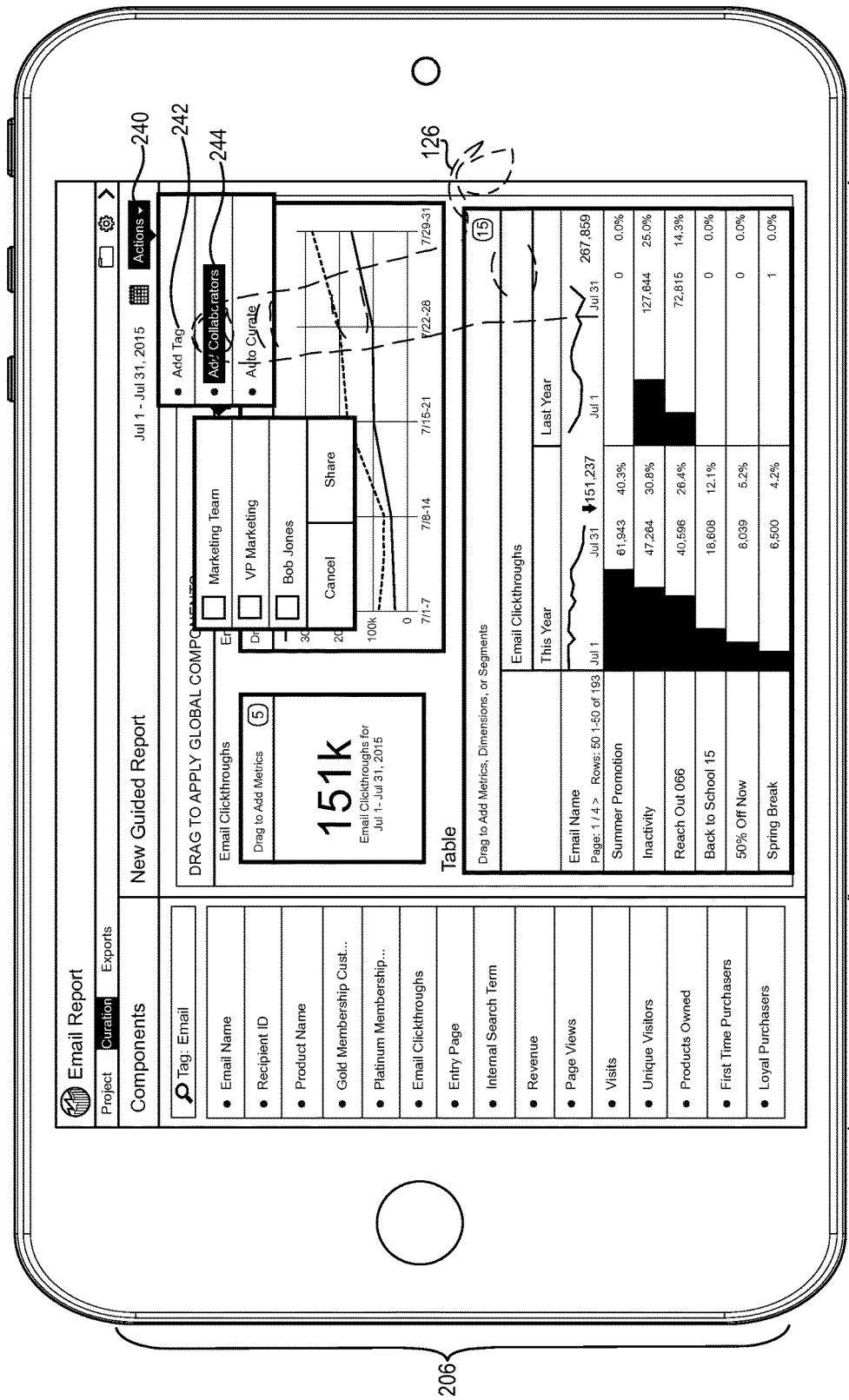
FIG. 2E illustrates the computing device and user interface of FIG. 2A together with elements for selecting collaborators in accordance with one or more embodiments.

Thus, with regard to the embodiment reflected in FIG. 2E, the curation system presents various individuals or groups as possible collaborators. In particular, the curation system presents "Marketing Team" (i.e., a department within a business organization), "VP Marketing" (i.e., a title of an individual within a business organization), and "Bob Jones" (i.e., the name of an individual). Although FIG. 2E displays a particular list of individuals and/or groups, it will be appreciated that the curation system can present a wide variety of individuals, groups, departments, titles, or other classifications of people that can receive data elements, analytics visualizations, and/or a curated digital analytics workspace.

In one or more embodiments, the curation system presents collaborators based on a variety of factors. For instance, the curation system presents collaborators based on user characteristics, search terms provided by a user, one or more selected data elements, one or more selected analytics visualizations, one or more previous recipients, usage history, or some other factor. For example, the curation system determines that an analyst has selected data elements and/or analytics visualizations (e.g., via the curating workspace 206) related to marketing. Based on that determination, the curation system can present "Marketing Team" or "VP Marketing" as a potential collaborator. Similarly, the curation system can identify a data element associated with an analytics visualization, determine that an analyst previously shared the data element with a particular recipient, and (based on the determination), present the particular recipient to the analyst.

Regardless of the particular method of presenting collaborators, in one or more embodiments the curation system identifies individuals or groups to receive one or more data elements and/or analytics visualizations. For instance, with regard to FIG. 2E, upon selection of "Marketing Team," the curation system shares one or more data elements and/or analytics visualizations with the Marketing Team.

Figure 3A:
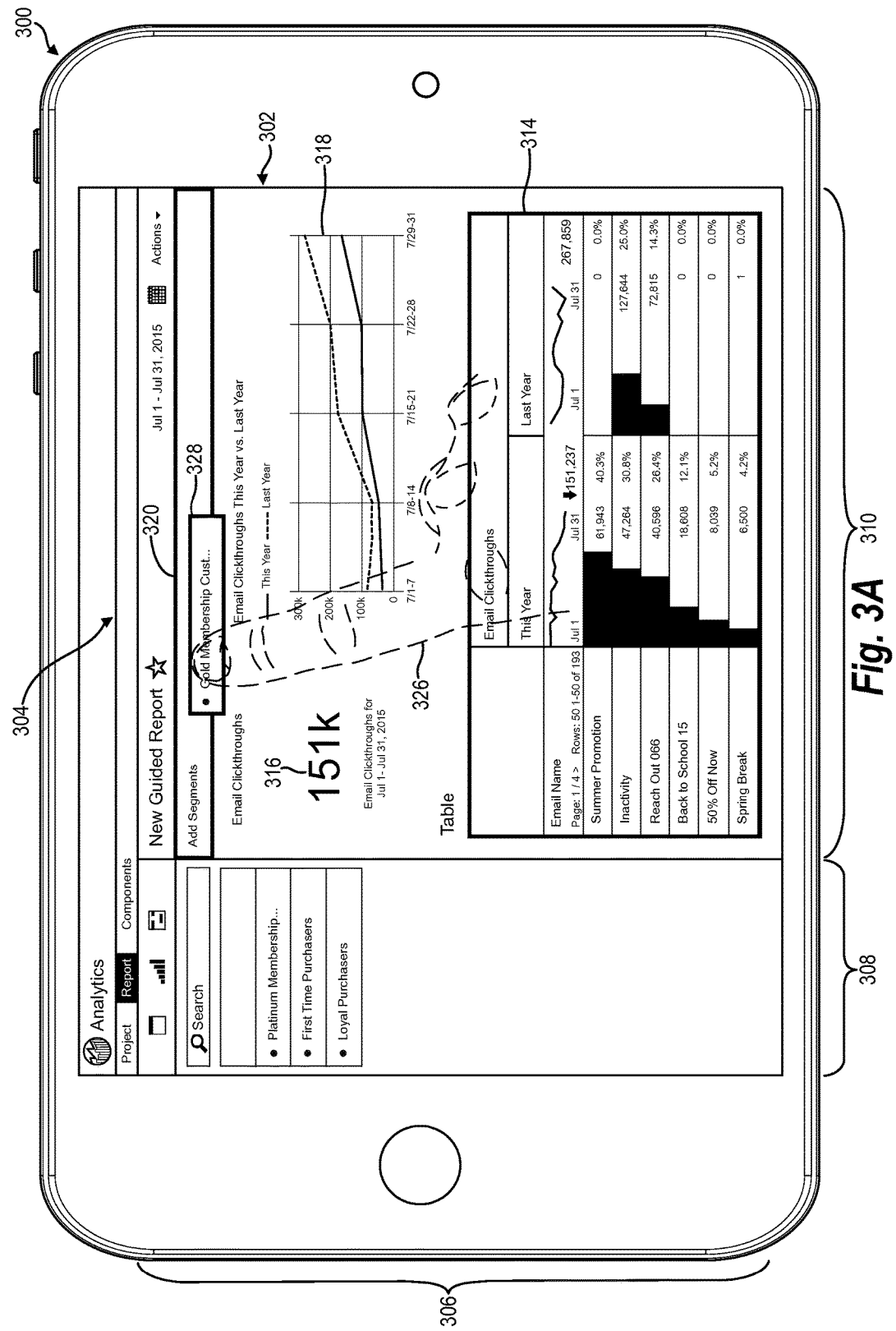
FIG. 3A illustrates a computing device displaying a user interface including a curated digital analytics workspace in accordance with one or more embodiments.
Figure 3B:
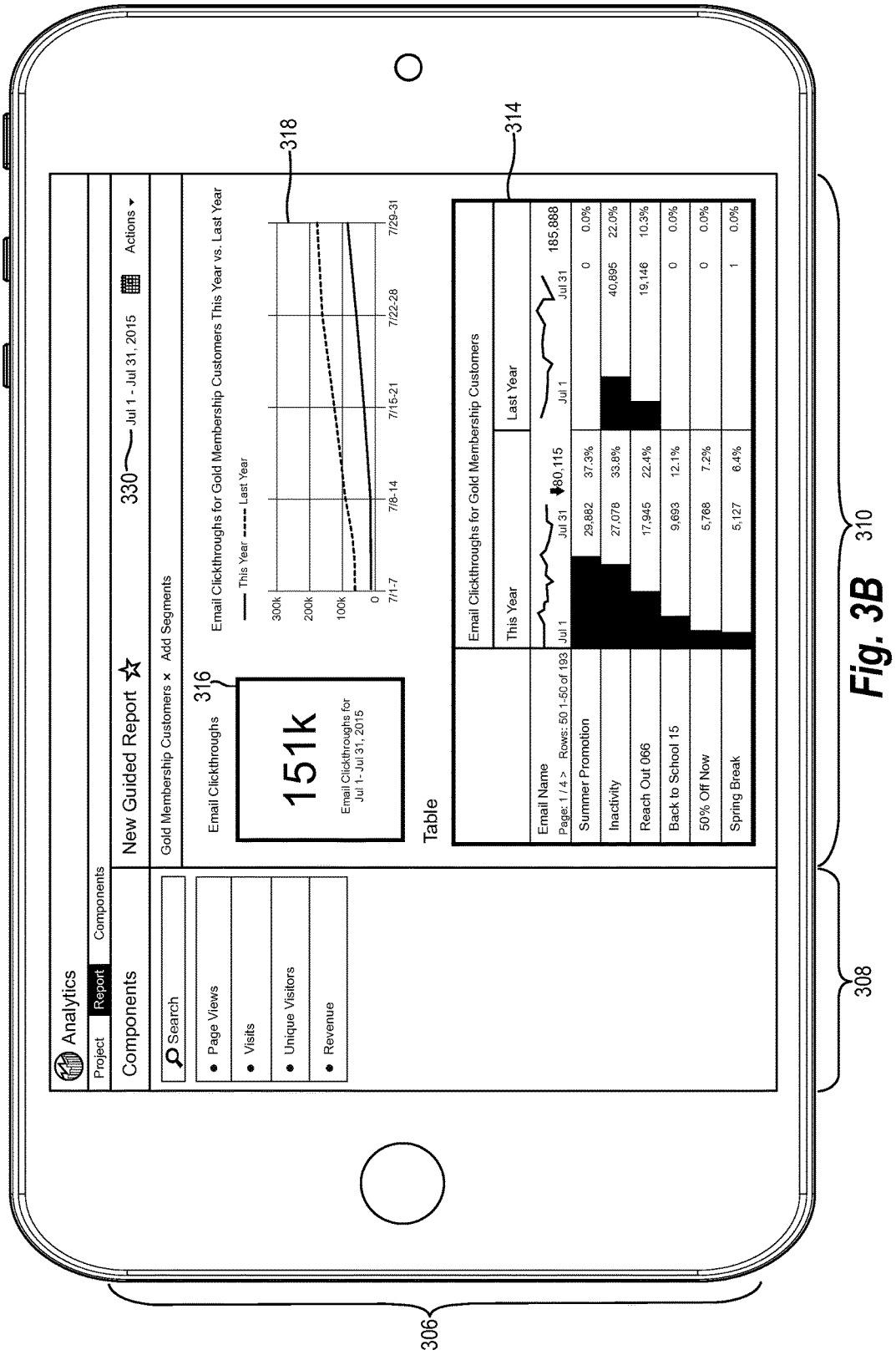
FIG. 3B illustrates the computing device, the user interface, and the curated digital analytics workspace of FIG. 3A with modified analytics visualizations in accordance with one or more embodiments.
Figure 3C:
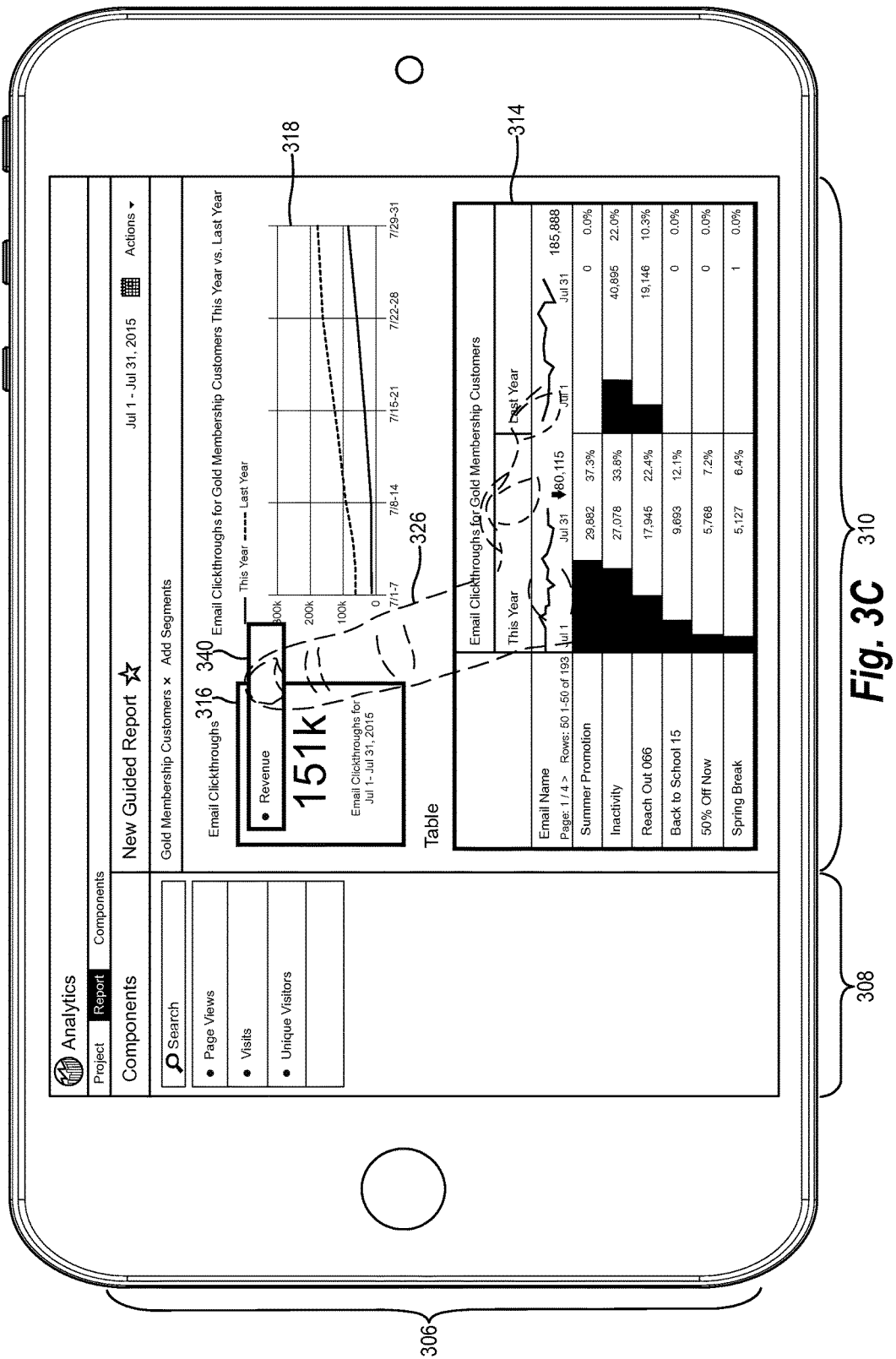
FIG. 3C illustrates the computing device, the user interface, and the curated digital analytics workspace of FIG. 3A showing a user interaction with a data element and analytics visualization in accordance with one or more embodiments.

Indeed, in one or more embodiments, the curation system utilizes the curating workspace 206 to identify data elements and/or analytics visualizations to provide to one or more additional users via a curated digital analytics workspace. For example, FIGS. 3A-3C provide additional detail with regard to generating and utilizing a curated digital analytics workspace. In particular, FIG. 3A illustrates a computing device 300 operatively coupled to a touch screen 302 displaying a user interface 304 containing a curated digital analytics workspace 306.

The curated digital analytics workspace 306 of FIG. 3A is based on the curating workspace 206 and the digital analytics workspace 106. In particular, the curated digital analytics workspace 306 contains a curated components display area 308 together with a curated data analysis display area 310. As illustrated, the curated components display area 308 and the curated data analysis display area 310 contain data elements and/or analytics visualizations from the curating workspace 206. Specifically, the curated components display area 308 contains data elements selected and/or associated with analytics visualizations via the curating workspace 206 and the curated data analysis display area 310 contains analytics visualizations selected via the curating workspace 206.

Notably, the curated digital analytics workspace 306 does not provide access to all of the data elements available via the digital analytics workspace 106. As described previously, the digital analytics workspace 106 provides access to thousands of data elements and/or analytics visualizations that can perform any variety of complex analytical calculations; however, the sheer volume of such options and features is often overwhelming and confusing to business users without significant analytics experience or training. Accordingly, the curated digital analytics workspace 306 contains a subset of such data elements (i.e., some but not all). For example, in one or more embodiments, the curated digital analytics workspace 306 provides access to only those data elements selected with regard to the curating workspace 206 (e.g., data elements associated with analytics visualizations in the curating data analysis display area 210). In particular, the data elements available via the curated components display area 308 are limited to the data elements selected with regard to the curating workspace 206 (e.g., the data elements corresponding to the combined data element representation 222).

Similarly, in one or more embodiments, the curated digital analytics workspace 306 does not provide access to all of the analytics visualizations available via the digital analytics workspace 106. For instance, the digital analytics workspace 106 provides access to any number of analytics visualizations. The curated digital analytics workspace 306 limits the available analytics visualizations, for example, to avoid confusing non-analysts and provide targeted capabilities suited to particular tasks, needs, or capabilities. Specifically, one or more embodiments, provide access to only analytics visualizations in the curated digital analytics workspace 306 that were included in the curating workspace 206 (or the digital analytics workspace 106). Thus, with regard to the embodiment illustrated in FIG. 3A, the curated digital analytics workspace 306 provides access to a curated table 314, a curated summary number 316, and a curated trended line chart 318, each corresponding to the curating table 214, the curating summary number 216, and the curating trended line chart 218 of the curating workspace 206 (and the table 120, the summary number visualization 142, and the trended line chart 144 of the digital analytics workspace 106).

Although FIG. 3A illustrates analytics visualizations in the curated digital analytics workspace 306 directly corresponding to the analytics visualizations shown in the digital analytics workspace 106 and the curating workspace 206, in one or more embodiments, the curation system provides one or more analytics visualizations in the curated digital analytics workspace 306 that were not utilized in the digital analytics workspace 106 and/or the curating workspace 206. For instance, one or more embodiments provide a subset of available analytics visualizations (i.e., a subset of analytics visualizations available in the digital analytics workspace 106) that can be utilized in the curated digital analytics workspace 306, regardless of whether the analytics visualizations were actually utilized in the digital analytics workspace 106 or the curating workspace 206. For instance, the curation system identifies a list of analytics visualizations to make available in the curated workspace 206 based on user input (e.g., user input by an analyst).

In generating the curated digital analytics workspace 306, the curation system can apply different limitations to data elements and analytics visualizations. For instance, in one or more embodiments, the curation system provides access to a limited set of data elements in generating the curated digital analytics workspace 306 without placing any limits on available analytics visualizations. The analytics system can apply various limitations applicable to either data elements or analytics visualizations in generating the curated digital analytics workspace 306.

As discussed previously, in one or more embodiments, the curation system limits data elements and/or analytics visualizations while still providing the ability to for users to dynamically analyze available data. In particular, FIG. 3A illustrates manipulation of the curated digital analytics workspace 306 according to one or more embodiments of the curation system. Specifically, in the exemplary embodiment of FIG. 3A, a user has selected an add segments bar 320, causing the curation system to display representations of data elements (e.g., customer segments) in the curated components display area 308. The curation system can modify analytics visualizations based on user interaction with data elements in the curated components display area 308. Specifically, FIG. 3A shows a input device 326 moving a gold membership customer data element representation 328 from the curated components display area 308 to the add segments banner 320 within the curated data analysis display area 310. In response to a drag and drop operation with regard to the gold membership customer data element representation 328 and the add segments banner 320, the curation system modifies one or more analytics visualizations.

In this manner, the curation system permits a user to manipulate available data elements and analytics visualizations to conduct an independent dynamic analysis. For example, FIG. 3B displays the curated digital analytics workspace 306 upon the input device 326 dragging and dropping the gold membership customer data element representation 328 to the add segments banner 320. In particular, the curation system has modified the analytics visualizations included in the curated data analysis display area 310. Specifically, the curated table 314 now displays email clickthrough data for "Gold Membership Customers." Similarly, the curated trended line chart 318 displays email clickthrough data for "Gold Membership Customers."

In one or more embodiments, the curation system filters application of certain data elements to certain analytics visualizations. Thus, as shown in FIG. 3B, despite the addition of "Gold Membership Customers" to the add segments banner 320 and the modifications to the curated table 314 and the curated trended line chart 318, the curated summary number 316 remains unchanged. The curation system can filter application of one or more data elements to one or more analytics visualizations based on a variety of factors, including the type of data element, the type of analytics visualization, limitations applied to the curating workspace 206, user input, or some other factor. For instance, as described previously, the curated summary number 316 may be unable to utilize certain data elements, such as customer segments. Accordingly, the curation system does not apply the "Gold Member Customer" data element to the curated summary number 316.

Additionally or alternatively, the curation system can limit application of data elements to analytics visualizations based on limitations applied to the curating workspace 206.

For example, as illustrated with regard to FIG. 2C, the curating system did not associate a "Gold Member Customer" data element to the curated summary number 216 in the curating workspace 206. In one or more embodiments, because the curation system limited the curating summary number 216 to certain data elements in the curating workspace 206, the curation system will not permit application of the "Gold Member Customer" data element to the curated summary number 316 in the curated digital analytics workspace 306. Indeed, in this manner, the curation system generates a curated digital analytics workspace 306 in which each analytics visualization is uniquely tailored to specific data elements and capabilities.

Indeed, FIG. 3B illustrates the data elements available for utilization with the curated summary number 316. Specifically, in one or more embodiments, upon user interaction with one or more analytics visualizations the curation system displays the data elements that can be utilized with the one or more analytics visualizations. Thus, in FIG. 3B the user has selected (e.g., initiated a select event with regard to) the curated summary number 316. In response, the curation system displays data elements available for utilization with the curated summary number 316 in the curated components display area 308. In particular, in this embodiment, the curation system has limited the data elements available for utilization with the curated summary number 316 to the five data elements associated with the curating summary number 216 in the curating workspace 206.

In addition to modifying analytics visualizations within the curated digital analytics workspace 306 based on interactions with the add segments banner 320, the curation system can also modify analytics visualizations in the curated digital analytics workspace 306 based on user interaction with a date modification element 330. In particular, the curation system can modify one or more date parameters applicable to one or more data elements and/or analytics visualizations. For instance, FIG. 3B illustrates date parameters Jul. 1-Jul. 31, 2015. Based on user interaction with the date modification element 330, the curation system modifies date parameters such that one or more analytics visualizations will display information corresponding to the modified date parameters. For example, the curation system displays information in one or more analytics visualizations with regard to the time period from Jul. 1 to Jul. 8, 2015 (e.g., email clickthroughs from Jul. 1 to Jul. 8, 2015).

In one or more embodiments, the curation system places limits on the available date parameters. For example, the curation system limits available date parameters based on the digital analytics workspace 106 and/or the curating workspace 206. For example, the curation system determines that the curating workspace 206 was limited to particular date parameters (e.g., Jul. 1-Jul. 31, 2015) and limit the available date parameters within the curated digital analytics workspace 306 based on the limitation in the curating workspace 206 (e.g., only permit date parameters in the curated digital analytics workspace 306 that fall within Jul. 1 to Jul. 31, 2015).

In addition to date parameters, the curation system can also modify analytics visualizations based on user interaction with one or more data elements and individual analytics visualizations. For instance, the curation system modifies analytics visualizations based on a user dragging and dropping one or more data elements to one or more analytics visualizations. FIG. 3C, for example, illustrates the input device 326 dragging a revenue data element representation 340 from the curated components display area 308 to the curated summary number 316 within the curated data analysis display area 310. In response to the input device 326 releasing the revenue data element representation 340, the curation system modifies the curated summary number 316. In particular, as illustrated in FIG. 3D, the curation system modifies the curated summary number 316 so that it no longer displays email clickthroughs from Jul. 1 to Jul. 31, 2015, but rather, displays revenue for Jul. 1 to Jul. 31, 2015.

Figure 3D:
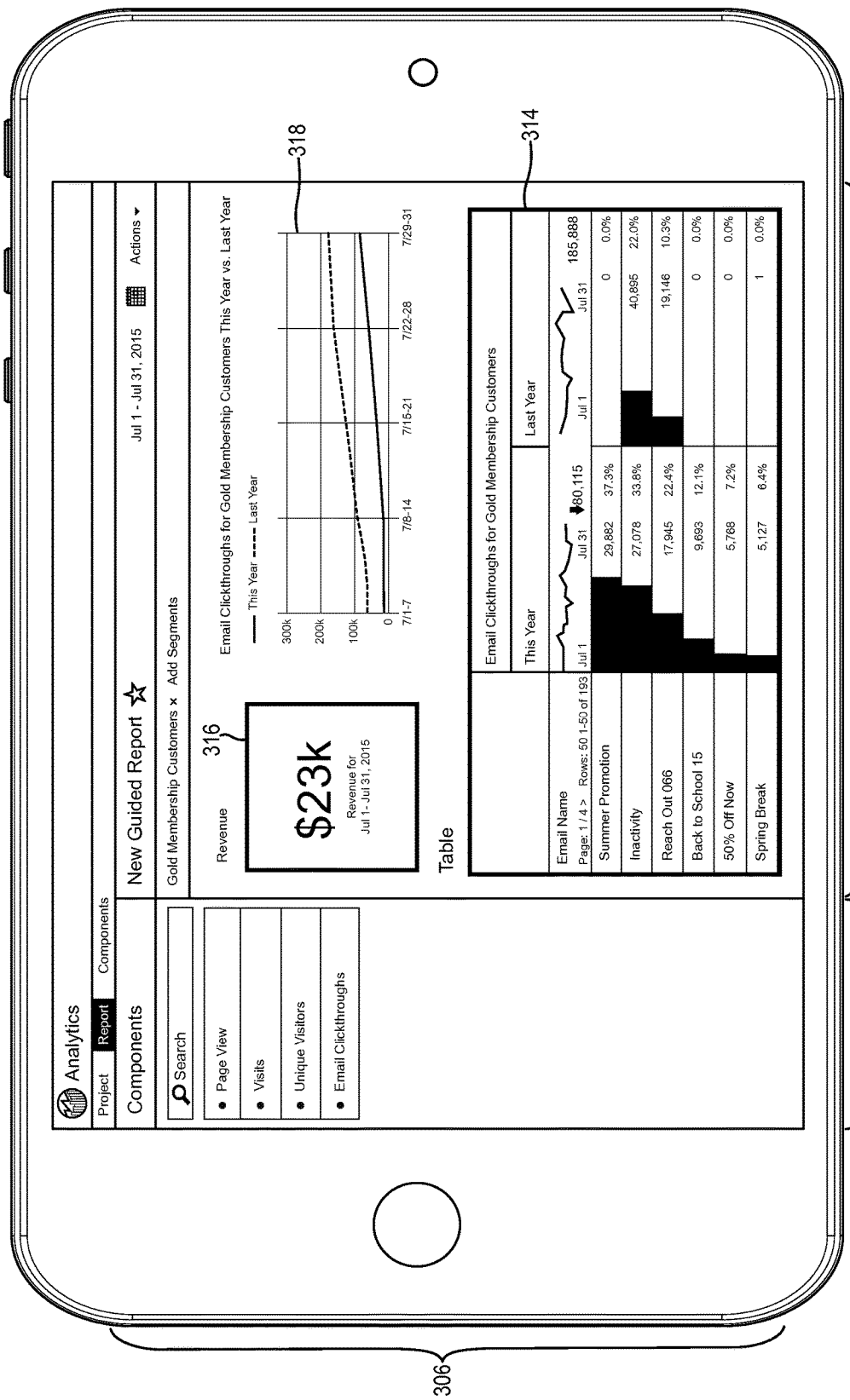
FIG. 3D illustrates the computing device, the user interface, and the curated digital analytics workspace of FIG. 3A with a modified analytics visualization based on user interaction with a data element and analytics visualization in accordance with one or more embodiments.

Although FIGS. 3C and 3D illustrate modification of the curated summary number 316 utilizing the revenue data element representation 340, the curation system can modify any analytics visualization based on user interaction with one or more data elements. For instance, in one or more embodiments, the input device 326 selects, drags, and drops three data elements from the curated components display area 308 to the curated table 314. The curation system modifies the curated table 314 to display the additional data elements. For example, the curated table 314 can display email clickthroughs for multiple customer segments, can display email clickthroughs for multiple dimensions (e.g., products), or display other metrics (e.g., page views or visits). Accordingly, the curation system and the curated digital analytics workspace 306 provide an elegant tool for dynamically analyzing data elements while guiding a user to pertinent and useful data elements and/or analytics visualizations.

Figure 3E:
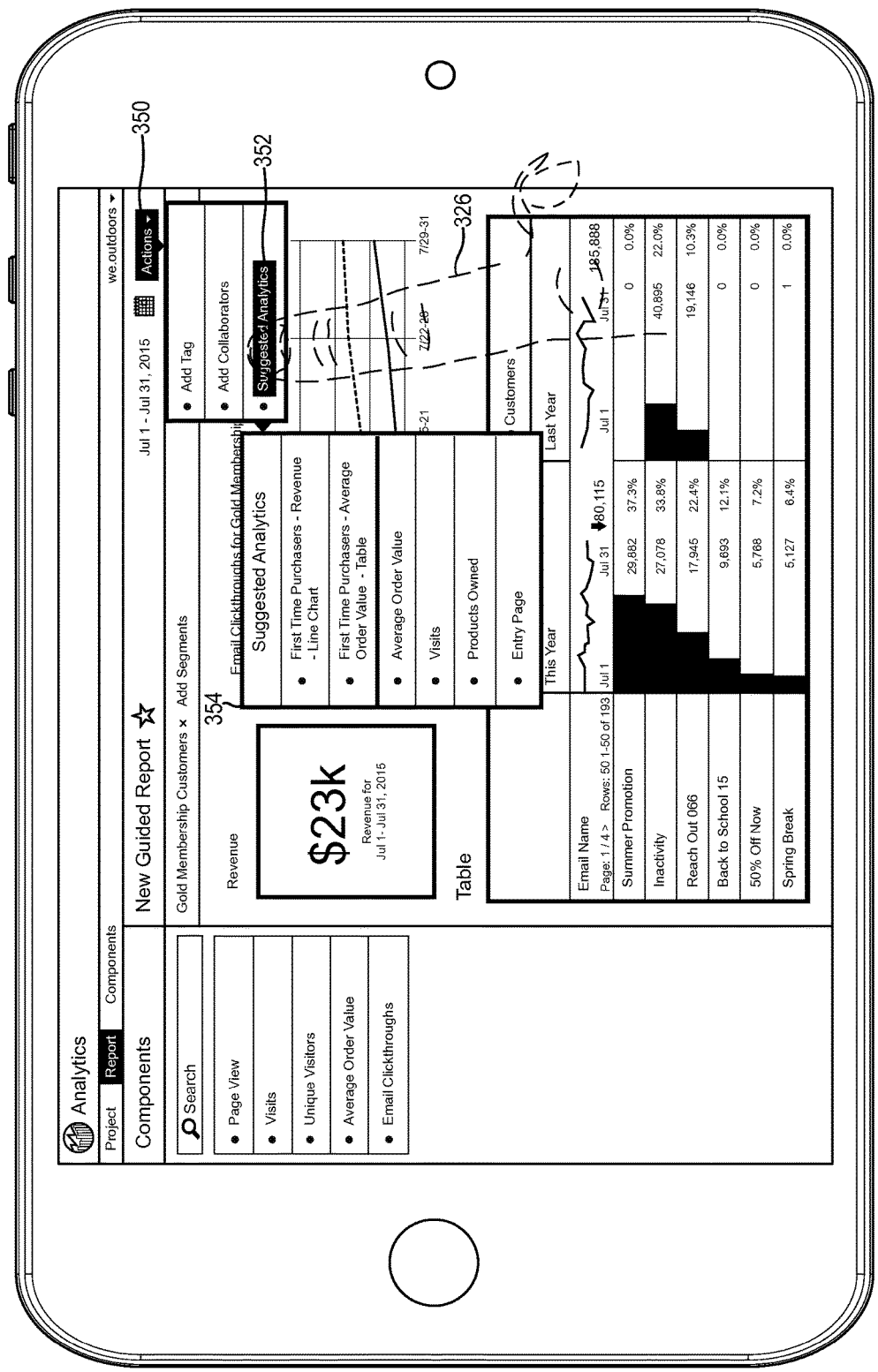
FIG. 3E illustrates the computing device, the user interface, and the curated digital analytics workspace of FIG. 3A together with suggested analytics visualizations and data elements in accordance with one or more embodiments.

To further assist in identifying useful data elements and/or analytics visualizations, in one or more embodiments, the curation system suggests one or more data elements and/or analytics visualizations via the curated digital analytics workspace 306. For example, FIG. 3E illustrates suggestions 354 in accordance with at least one embodiment of the curation system. In particular, upon user interaction with action element 350, the curation system provides a menu of options, including a suggested analytics element 352. Upon user interaction with the suggested analytics element 352 (e.g., selection by finger 362), the curation system provides the suggestions 354, including one or more suggested data elements and/or analytics visualizations.

As previously discussed, the curation system provides one or more suggestions based on a variety of factors, including, but not limited to, user characteristics, features of data elements (e.g., anomalies in one or more data elements or data elements previously selected by a user of the curated digital analytics workspace 306), features of analytics visualizations, user interactions with one or more suggestions, or other factors.

For example, with regard to FIG. 3A, the curation system suggests "First Time Purchasers—Revenue—Line Chart" based on a previous user interaction with the curated digital analytics workspace 306; in particular, modification of the curated summary number 316 from email clickthroughs to revenue (as described above with regard to FIGS. 3C and 3D). Similarly, the curation system suggests "First Time Purchasers—Average Order Value—Table" based on an analytics visualization (e.g., a table) previously utilized by a user of the curated digital analytics workspace 306. In addition, the curation system suggests an "average order value" data element based on a rapid increase in average order value over the previous month. Moreover, the curation system suggests "visits" based on another user with similar user characteristics (e.g., a user in the same department with similar responsibilities) utilizing a data elements related to visits. In sum, the curation system can suggest data elements and/or analytics visualizations based on any variety of factors, in isolation or in combination.

With regard to FIG. 3E, it will be noted that the curation system suggested analytics visualizations and data elements previously selected with regard to the curating workspace 206. In one or more embodiments, the curation system will limit suggested data elements and/or analytics visualizations for the curated digital analytics workspace 306 based on the digital analytics workspace 106 and/or the curating workspace 206. For instance, in one or more embodiments, the curation system will only suggest analytics visualizations and/or data elements that were selected in the curating workspace 206 (or the digital analytics workspace 106).

In other embodiments, the curation system will not limit suggested data elements and/or analytics visualizations. For instance, in one or more embodiments, the curation system will consider the digital analytics workspace 106 and/or the curating workspace 206 in suggesting data elements and/or analytics visualizations for the curated digital analytics workspace 306, but will not limit suggestions to only those data elements and analytics visualizations selected or utilized in the digital analytics workspace 106 and/or the curating workspace 206. Yet other embodiments of the curation system will provide pertinent suggestions without any consideration of the digital analytics workspace 106 and the curating workspace 206.

Although embodiments of the curation system illustrated with regard to FIGS. 2A-3E utilize the curating workspace 206 to select and/or limit one or more analytic visualizations and one or more data elements, other embodiments of the curation system do not utilize a separate curating workspace. For instance, in one or more embodiments, the curation system generates a curated digital analytics workspace with analytics visualizations and/or data elements from a single digital analytics workspace. For instance, in one or more embodiments the curation system combines the functionality of the digital analytics workspace 106 and the curating workspace 206 in a single digital analytics workspace that allows for foraging and selection/limitation of data elements and/or analytics visualizations.

Specifically, if a user creates an analytics visualization utilizing one or more data elements via the digital analytics workspace 106, in one or more embodiments, the curation system shares the created analytics visualization and the one or more data elements with one or more additional users. In such circumstances, for example, the curation system limits the data elements and analytics visualizations available via the curated digital analytics workspace 306 based on the analytics visualization and the one or more data elements selected from the digital analytics workspace 106. Additionally or alternatively, in such circumstances the curation system limits data elements and analytics visualizations available via the curated digital analytics workspace 306 based on user characteristics or any other factor described herein.

The curation system provides and utilizes analytics information for a variety of applications and purposes. In particular, the curation system can provide a curated digital analytics workspace, data elements, and/or analytics visualizations for utilization in a variety of business decisions. For example, the curation system provides information for utilization in making one or more marketing decisions or policies (e.g., setting advertising content, targeting advertising to particular individuals or groups, setting advertising costs, deciding on advertising placement, deciding on marketing terms or marks), product decisions or policies (e.g., setting product lines, modifying product features, making manufacturing decisions), supply chain decisions or policies (e.g., identifying sources for products, deciding on shipping or delivery mechanisms), inventory decisions or policies (e.g., setting amounts of inventory, setting inventory locations), engineering decisions or policies (e.g., deciding on design features, setting safety factors or features) publishing decisions or policies (e.g., setting publishing content, making editorial decisions), human resources decisions or policies (e.g., establishing hiring rates, setting benefits policies, deciding on recruiting policies) legal decisions or policies (e.g., deciding to initiate suit, deciding to settle a dispute, setting compliance policies), or other business decisions or policies.

Moreover, although FIGS. 1A-3E predominantly discuss data related to internet marketing, the curation system can perform its functions with regard to any type or kind of data, including raw or processed data. For instance, the curation system can utilize data related to business, government, politics, engineering, science, or other fields. Thus, with regard to business data, in addition to marketing, the curation system can analyze information with regard to shipping, inventory, engineering, product performance, sales, employees, or other information. In sum, the curation system can be utilized for a variety of purposes in a variety of implementations.

Figure 4:
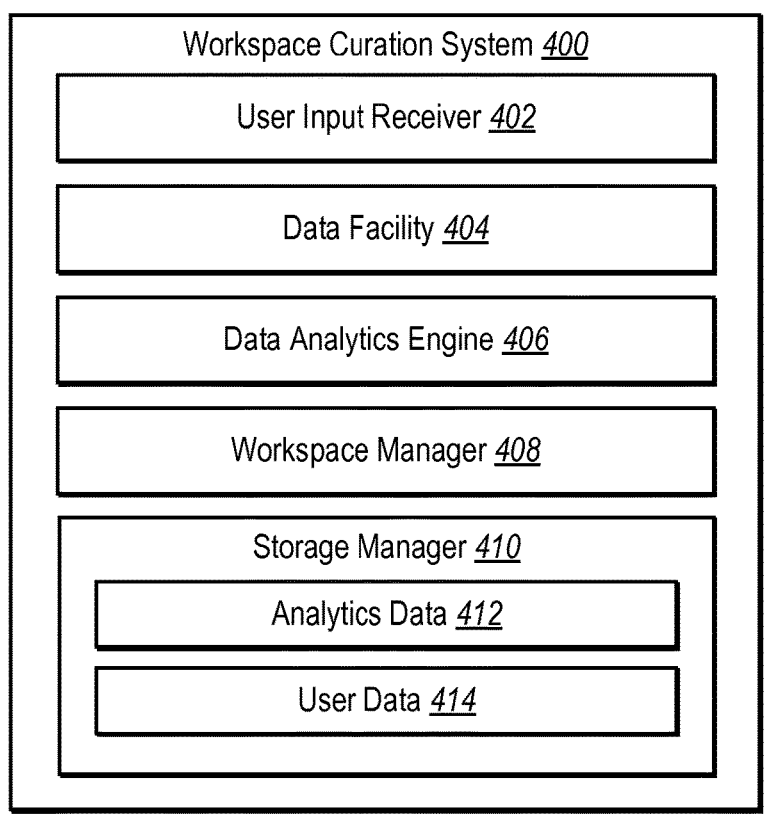
FIG. 4 illustrates a schematic diagram of a curation system in accordance with one or more embodiments.

Turning now to FIG. 4, additional detail will be provided regarding components and functions of one example architecture of a curation system according to one or more embodiments. In particular, FIG. 4 illustrates an embodiment of an exemplary workspace curation system 400 (e.g., "curation system," described above). The workspace curation system 400 may include, but is not limited to, a user input receiver 402, a data facility 404, a data analytics engine 406, a workspace manager 408, and a storage manager 410. Moreover, the storage manager 410 may also include analytics data 412 and user data 414.

As illustrated in FIG. 4, the workspace curation system 400 includes the user input receiver 402. The user input receiver 402 can obtain, identify, receive, monitor, capture, or detect user input. For example, the user input receiver 402 identifies one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction. The user input receiver 402 can operate in conjunction with any number of user input devices or computer devices (in isolation or in combination), including personal computers, laptops, smartphones, smart watches, tablets, touch screen devices, televisions, personal digital assistants, mouse devices, keyboards, track pads, or stylus devices. Similarly, the user input receiver 402 can identify or detect a user interaction with respect to a variety of user interface elements, such as selection of a graphical button or a drag event within a graphical object. Moreover, the user input receiver 402 can communicate with, and thus receive user input with respect to, a variety of programs, applications, plug-ins, operating systems, user interfaces, or other implementations in software or hardware.

As illustrated in FIG. 4, the workspace curation system 400 also includes the data facility 404. The data facility 404 can gather, collect, identify, or detect data or information for the workspace curation system 400. For example, the data facility 404 identifies user characteristics, features of one or more data elements, features of one or more analytics visualizations, usage information, or other data or information.

The data facility 404 can identify data or information from any source. In particular, the data facility 404 can obtain information from one or more servers, client devices, networks, storage media, web sites, files, or other sources.

For instance, the data facility 404 may utilize one or more servers (e.g., a server connected to one or more client devices) to identify usage information with regard to usage history. Additionally or alternatively, the data facility 404 can access a profile associated with a user on a local client device or server utilized by the user to identify user characteristics.

The data facility 404 can identify any data or information necessary for the workspace curation system 400 to perform its functions, including any features, characteristics, or factors discussed herein. For instance, with regard to user characteristics, the data facility 404 can identify from available sources, a job title, department, usage history, or other information. Similarly, with regard to features of data elements, the data facility 404 can identify variations in data trends, outliers, data types, data topics, or other features.

As illustrated in FIG. 4, the workspace curation system 400 includes the data analytics engine 406. The data analytics engine 406 can analyze, calculate, manipulate, modify, compare, or process data. The data analytics engine 406 can perform a variety of mathematical calculations ranging from addition, subtraction, and multiplication to multi-variable calculus, differential equations, and linear algebra operations. Moreover, the data analytics engine 406 can perform a variety of types of analysis, including freeform "pivot-table" analysis, contribution analysis, anomaly detection, clustering, auto-segmentation, path fallout/flow, or other analysis. In short, the data analytics engine 406 can perform any type of data science or analysis exploration.

In particular, the data analytics engine 406 can analyze one or more data elements. For example, upon a user interaction with a plurality of data elements, the workspace curation system 400 analyzes, compares, or manipulates the data elements. By way of a specific example, the data analytics engine 406 calculates email clickthroughs with regard to variations in time, products, email names, or other segments, dimensions, or metrics.

In one or more embodiments, the data analytics engine 406 reduces the time to analyze data elements and present data elements or analytics visualizations by performing its functions in isolation from one or more other components. For example, some web-based systems significantly slow time for presenting analytics data by refreshing a web page, repainting, and reloading for any data modification. In one or more embodiments, the data analytics engine 406 provides updated analytics information without repainting or reloading the entire webpage.

Moreover, as illustrated in FIG. 4, the workspace curation system 400 may also include the workspace manager 408. The workspace manager 408 can create, build, generate, modify, control, build, remove, share, or provide one or more workspaces. For instance, the workspace manager 408 creates a digital analytics workspace, a curating workspace, and/or a curated digital analytics workspace, as previously described. Moreover, the workspace curation system 400 may also create, manage, and control a user interface containing one or more workspaces.

The workspace manager 408 may facilitate presentation of information by way of an external component of a client device. For example, the workspace manager 408 displays a user interface containing a workspace by way of a display screen associated with a client device. The user interface may be composed of a plurality of graphical components, objects, and/or elements that allow a user to perform a function. For example, the workspace manager 408 can display icons, dialogue boxes, banners, buttons, pop-ups, or other elements. The workspace manager 408 can present, via a client device, a variety of types of information, including text, images, video, audio, or other information. Moreover, the workspace manager 408 can provide a variety of user interfaces specific to any variety of functions, programs, applications, plug-ins, devices, operating systems, and/or components of a client device.

The workspace manager 408 can generate, modify, or remove a variety of analytics visualizations. For instance, based on data received from the data analytics engine 406, the workspace manager 408 generates any number of analytics visualizations, such as graphs, charts, tables, or other visualizations. The workspace manager 408 can also modify analytics visualizations. For instance, the workspace manager 408 modifies analytics visualizations based on modifications in data, based on user interaction with one or more data elements, user input, or other factors.

In particular, in one or more embodiments, the workspace manager 408 modifies one or more analytics visualizations in response to a drag and drop event. For instance, the workspace manager 408 modifies one or more analytics visualizations based on a user selecting a data element in a first portion of a digital analytics workspace (e.g., a component display area), moving the data element to a second portion of a digital analytics workspace (e.g., a data analysis display area), and unselecting the data element while the data element is in the second portion of the digital analytics workspace. More specifically, as described above, in one or more embodiments, the workspace manager 408 creates or modifies one or more analytics visualizations based on a press or select event with regard to a data element (e.g., select a mouse button or press a touch screen), a move event with regard to a data element (e.g., moving a mouse or finger on a touch screen), and a release event with regard to the data element (e.g., release a mouse button or lift a finger from a touch screen).

As mentioned previously, the workspace manager 408 can create a variety of workspaces. For instance, the workspace manager 408 creates a digital analytics workspace (e.g., the digital analytics workspace 106). In particular the workspace manager 408 can create a digital analytics workspace that permits a user (e.g., an analyst) to forage through a plurality of data elements and create a plurality of analytics visualizations.

The workspace manager 408 can also create a curating workspace (e.g., the curating workspace 206). In particular, the workspace manager 408 can create a curating workspace that assists in limiting data elements and/or analytics visualizations from a digital analytics workspace (e.g., the digital analytics workspace 106).

The workspace manager 408 can also create a curated digital analytics workspace (e.g., the curated digital analytics workspace 306). For example, the workspace manager 408 creates a curated digital analytics workspace that provides access to a subset of the plurality of data elements available via the digital analytics workspace 106. In one or more embodiments, the workspace manager 408 generates a curated digital analytics workspace based on the digital analytics workspace 106 (i.e., based on the data elements and/or analytics visualizations utilized in the digital analytics workspace 106). Similarly, in one or more embodiments, the workspace manager 408 generates a curated digital analytics workspace based on the curating workspace 206 (i.e., based on limitations applied, data elements selected, and/or analytics visualizations selected in the curating workspace 206).

As discussed, the workspace manager 408 can curate, limit, or revise a digital analytics workspace. For example, the workspace manager 408 identifies pertinent data elements and/or analytics visualizations and curates a digital analytics workspace to generate a curated digital analytics workspace that includes the pertinent data elements and/or analytics visualizations. The workspace manager 408 can curate, limit, or revise a digital analytics workspace based on a number of factors.

For example, the workspace manager 408 curates, limits, or revises a digital analytics workspace based on one or more user characteristics (as described in detail above). Similarly, the workspace manager 408 curates a digital analytics workspace based on usage history, features of one or more data elements, features of one or more analytics visualizations, user input or other factors.

Similarly, to assist in curating a digital analytics workspace, the workspace manager 408 provides one or more suggestions. In particular, the workspace manager 408 suggests one or more data elements and/or analytics visualizations. For example, the workspace manager 408 can suggest a data element and/or analytics visualization via a digital analytics workspace or a curating workspace (e.g., to an analyst utilizing a digital analytics workspace). Similarly, the workspace manager 408 can suggest a data element and/or analytics visualization via a curated digital analytics workspace (e.g., to a non-analyst utilizing a curated digital analytics workspace).

The workspace manager 408 can also apply one or more tags. In particular, the workspace manager 408 applies tags to one or more data elements and/or analytics visualizations. As described previously, the workspace manager 408 applies tags based on user input, data type, topics associated with data, data source, data usage, or other factors.

The workspace manager 408 can also provide one or more search functions. For instance, the workspace manager 408 can search for data elements, analytics visualizations, tags, or other information. By utilizing tags in combination with one or more search functions, the workspace manager 408 provides a simple way to identify data elements and/or analytics visualizations targeted to particular groups or individuals.

As illustrated in FIG. 4, the workspace curation system 400 includes the storage manager 410. The storage manager 410 maintains data for the workspace curation system 400. The storage manager 410 can maintain data of any type, size, or kind as necessary to perform the functions of the workspace curation system 400.

The storage manager 410, as shown in FIG. 4, includes analytics data 412. Analytics data 412 may include any data an individual, group, business, or government seeks to analyze. Analytics data 412 may include a plurality of data elements, including segments, metrics, dimensions, or other data elements. For example, the analytics data 412 includes any data collected during operation of a business, including customer data, sales data, marketing data, revenue data, inventory data, accounting data, or other data. Analytics data 412 may also include information needed or utilized in analyzing data by the workspace curation system 400. For instance, analytics data 412 includes data calculated or produced by the data analytics engine 406.

As illustrated in FIG. 4, the storage manager 410 also includes user data 414. User data 414 includes any information regarding any user (or group of users) of the workspace curation system 400. For instance, user data 414 includes usage history; data elements utilized, created, or modified by a user; analytics visualizations utilized, created, or modified by a user; user characteristics, or other information.

Each of the components 402-410 of the workspace curation system 400 and their corresponding elements (as shown in FIG. 4) may be in communication with one another using any suitable communication technologies. It will be recognized that although components 402-410 and their corresponding elements are shown to be separate in FIG. 4, any of components 402-410 and their corresponding elements may be combined into fewer components, such as into a single facility or module, divided into more components, or configured into different components as may serve a particular embodiment.

The components 402-410 and their corresponding elements can comprise software, hardware, or both. For example, the components 402-410 and their corresponding elements can comprise one or more instructions stored on a computer-readable storage medium and executable by processors of one or more computing devices. When executed by the one or more processors, the computer-executable instructions of the workspace curation system 400 can cause a client device and/or a server device to perform the methods described herein. Alternatively, the components 402-410 and their corresponding elements can comprise hardware, such as a special purpose processing device to perform a certain function or group of functions. Additionally or alternatively, the components 402-410 and their corresponding elements can comprise a combination of computer-executable instructions and hardware.

Furthermore, the components 402-410 of the workspace curation system 400 may, for example, be implemented as one or more stand-alone applications, as one or more modules of an application, as one or more plug-ins, as one or more library functions or functions that may be called by other applications, and/or as a cloud-computing model. Thus, the components 402-410 of the workspace curation system 400 may be implemented as a stand-alone application, such as a desktop or mobile application. Furthermore, the components 402-410 of the workspace curation system 400 may be implemented as one or more web-based applications hosted on a remote server. Alternatively or additionally, the components of the workspace curation system 400 may be implemented in a suit of mobile device applications or "apps." To illustrate, the components of the workspace curation system 400 may be implemented in a data analytics application, including but not limited to ADOBE ANALYTICS or ADOBE MARKETING CLOUD. "ADOBE," "ADOBE ANALYTICS" and "ADOBE MARKETING CLOUD" are either registered trademarks or trademarks of Adobe Systems Incorporated in the United States and/or other countries.

Figure 5:
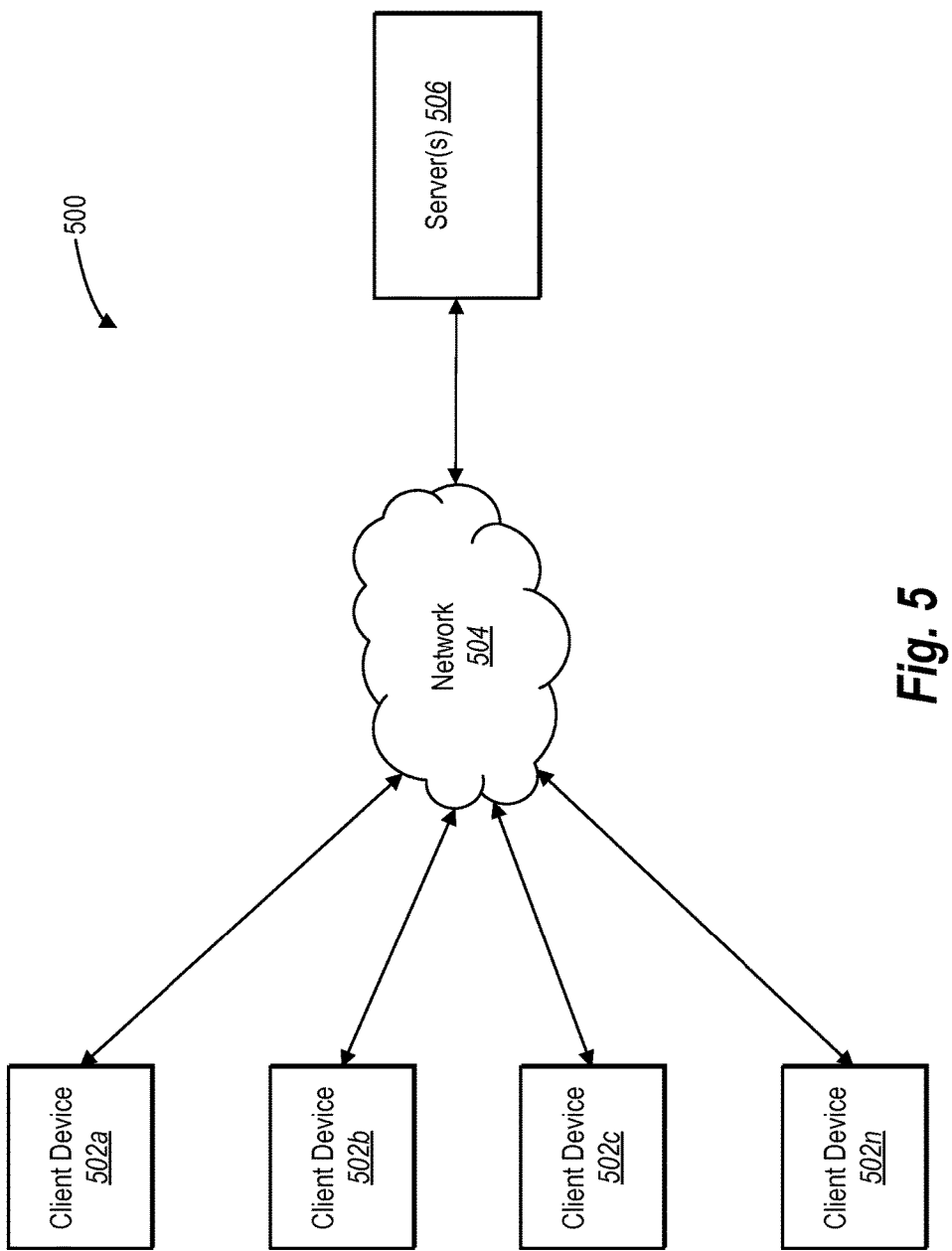
FIG. 5 illustrates a schematic diagram of an exemplary environment in which the curation system can operate in accordance with one or more embodiments.

For instance, FIG. 5 illustrates a schematic diagram of one embodiment of an exemplary environment 500 in which the workspace curation system 400 can operate. In one or more embodiments, the exemplary environment 500 includes a server 506 connected to a plurality of client devices 502a-502n via a network 504.

The computing devices 502a-502n, the network 504, and the server 506 may communicate with each other or other components using any communication platforms and technologies suitable for transporting data and/or communication signals, including any known communication technologies, devices, media, and protocols supportive of remote data communications, examples of which will be described in more detail below with respect to FIG. 7.

Although FIG. 5 illustrates a particular arrangement of the computing devices 502a-502n, the network 504, and the server 506, various additional arrangements are possible. For example, the computing devices 502a-502n may directly communicate with the server 506, bypassing the network 504. Or alternatively, the computing devices 502a-502n may directly communicate with each other.

Similarly, although the environment 500 of FIG. 5 is depicted as having various components, the environment 500 may have additional or alternative components. For example, the environment 500 can be implemented on a single computing device with the workspace curation system 400. In particular, the workspace curation system 400 may be implemented in whole or in part on the client device 502a.

As illustrated in FIG. 5, the environment 500 may include client devices 502a-502n. The client devices 502a-502n may comprise any computing device. For example, client devices 502a-502n may comprise one or more personal computers, laptop computers, mobile devices, mobile phones, tablets, special purpose computers, TVs, or other computing devices, including computing devices described below with regard to FIG. 7. Although four client devices are presented with regard to FIG. 5, it will be appreciated that client devices 502a-502n may comprise any number of client devices (greater or smaller than shown).

Moreover, as illustrated in FIG. 5, the client devices 502a-502n and server 506 may communicate via the network 504. The network 504 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 504 may be any suitable network over which the computing device 502 may access the server 506 and/or the client device 502a-502n, or vice versa. The network 504 will be discussed in more detail below with regard to FIG. 7.

In addition, the environment 500 may also include the server 506. The server 506 may generate, store, receive, and transmit any type of data, including analytics data 412, user data 414, or other information. For example, the server 506 may receive data from a client device, such as the client device 502a, and send the data to another client device, such as the client device 502b, 502c, and/or 502d. The server 506 can also transmit electronic messages between one or more users of the environment 500. In one example embodiment, the server 506 is a data server. The server 506 can also comprise a communication server or a web-hosting server. Additional details regarding the server 506 will be discussed below with respect to FIG. 7.

As mentioned, in one or more embodiments, the server 506 can include or implement at least a portion of the workspace curation system 400. In particular, the workspace curation system 400 can comprise an application running on the server 506 or a portion of a workspace curation system 400 can be downloaded from the server 506. For example, the workspace curation system 400 can include a web hosting application that allows the client devices 502a-502n to interact with content hosted at the server 506. To illustrate, in one or more embodiments of the exemplary environment 500, one or more client devices 502a-502n can access a webpage supported by the server 506. In particular, the client device 502a can run a web application (e.g., a web browser) to allow a user to access, view, and/or interact with a webpage or website hosted at the server 506.

Upon the client device 502a accessing a webpage hosted at the server 506, in one or more embodiments, the server 506 can provide (e.g., utilizing the workspace manager 408) a digital analytics workspace to the client device 502a to be presented in connection with the webpage. In particular, the server 506 can provide via network 504 a digital analytics workspace (e.g., the digital analytics workspace 106) that provides access to a plurality of data elements and permits creation and modification of one or more analytics visualizations. The server 506 (e.g., utilizing the storage manager 410) can provide any other necessary information for operation of the workspace curation system 400, such as analytics data, user data, metadata, or other data. Similarly, the client device 502a can provide user input (e.g., via the user input receiver 402) to the server 506 and the workspace curation system 400. The client device 502a can also communicate user data or other information to the server 506.

Moreover, in one or more embodiments, the server 506 and the workspace curation system 400 can provide a curating workspace to client device 502a. The client device 502a can communicate with the server 506 and the workspace curation system 400 to curate a digital analytics workspace (i.e., to limit one or more data elements from the digital analytics workspace). For example, the server 506 and the workspace curation system 400 can utilize user characteristics to curate the digital analytics workspace to the particular needs of a user.

In at least one embodiment, the server 506 provides a curated digital analytics workspace to client device 502b, based on the information provided from client device 502a. In particular, the server 506 and the workspace curation system 400 provide a curated digital analytics workspace to the client device 502b based on the digital analytics workspace and/or the curated digital analytics workspace generated with regard to information received from client device 502a.

As just described, the workspace curation system 400 may be implemented in whole, or in part, by the individual elements 502a-506 of the environment 500. For instance, in one or more embodiments, the workspace curation system 400 may be implemented on the client device 502a. Similarly, the workspace curation system 400 may be implemented on the server 506. Moreover, different components and functions of the workspace curation system 400 may be implemented separately among clients devices 502a-502n, the server 506, and the network 504. For instance, in one or more embodiments the user input receiver 402 is implemented as part of the client device 502a, the client device 502b, and the server 506; the data facility 404 is implemented as part of the client devices 502a-502n, the server 506, and the software component 508; the data analytics engine 406 is implemented as part of the server 506 and the software component 508; the workspace manager 408 is implemented as part of the server 506, and/or the client devices 502a-502b; and the storage manager 410 is implemented as part of the client devices 502a-502n and the server 506. The environment 500 can also be implemented in a variety of additional or alternative arrangements.

Moreover, the workspace curation system 400 and/or server 506 can actively collect information independently of a particular client device and independent of other components of the environment 500. For example, the workspace curation system 400 and/or server 506 can actively collect information from interaction between users and the server 506 (or other servers). In particular, the workspace curation system 400 and server 506 can automatically collect and provide analytics data 412, user data 414, or other information for operation of the workspace curation system 400.

In alternative embodiments, the environment 500 can include a data collection system. In particular, the data collection system can be a third-party system that facilitates the collection of data, such as analytics data 412. For example, a third party data collection system can provide information regarding web page visits, email clickthroughs, orders from visits, or other information. Similarly, a data collections system can actively collect and monitor user data 414. The workspace curation system 400 can provide updated information as additional data becomes available.

Figure 6:
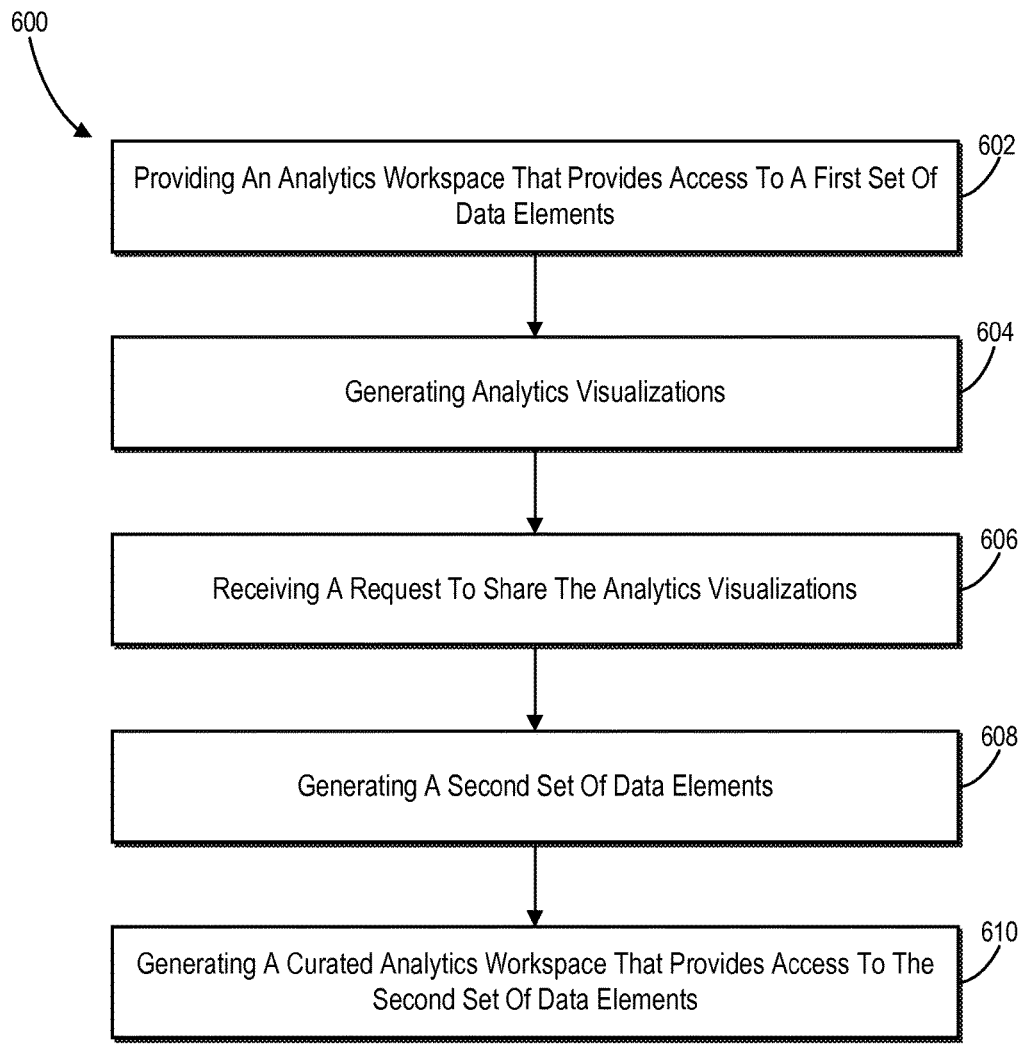
FIG. 6 illustrates a flowchart of a series of acts in a method of providing a workspace in accordance with one or more embodiments.

FIGS. 1-5, the corresponding text, and the examples, provide a number of different systems and devices that allows a user to facilitate generation and presentation of a curated digital analytics workspace. In addition to the foregoing, embodiments can also be described in terms of flowcharts comprising acts and steps in a method for accomplishing a particular result. For example, FIG. 6 illustrates a flowchart of an exemplary method in accordance with one or more embodiments of the present invention. The method described in relation to FIG. 6 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of a series of acts in a method 600 of curating a digital analytics workspace in accordance with one or more embodiments of the present invention. In one or more embodiments, the method 600 is performed in a digital medium environment that includes the workspace curation system 400. The method 600 is intended to be illustrative of one or more methods in accordance with the present disclosure, and is not intended to limit potential embodiments. Alternative embodiments can include additional, fewer, or different steps than those articulated in FIG. 6.

The method 600 includes an act 602 of providing a digital analytics workspace 106 that provides access to a first set of data elements. In particular, the act 602 may include providing a digital analytics workspace 106 that provides access to and allows manipulation of a first set of data elements to create one or more analytics visualizations 120, 142, 144. More particularly, in one or more embodiments, act 602 providing access to a first set of data elements comprises providing access to all of the data elements.

As illustrated in FIG. 6, the method 600 also includes an act 604 of generating analytics visualizations 120, 142, 144. In particular, the act 604 may include generating, by at least one processor and based on user input received via the digital analytics workspace, one or more analytics visualizations 120, 142, 144 using one or more elements from the first set of data elements. In addition, the act 604 can also include generating the one or more analytics visualizations 120, 142, 144 from a first set of analytics visualizations.

Furthermore, generating the one or more analytics visualizations 120, 142, 144 using the one or more elements of the first set of data elements may comprise: receiving a select even in relation to a first representation 128 of at least one data element from the first set of data element located in a first portion 114 of a first user interface 104; receiving a drag event in relation to the first representation 128, the drag event comprising moving the first representation 128 from the first portion 114 of the first user interface 104 to a second portion of 110 the first user interface 104, and receiving a release even in relation to the first representation 128, the release event occurring when the first representation 128 is located in the second portion 110 of the first user interface 104. Moreover, the act 604 may generate the one or more analytics visualizations 120, 142, 144 in response to receiving the select event, the drag event, and the release event.

Moreover, as illustrated in FIG. 6, the method 600 also includes an act 606 of receiving a request to share the analytics visualizations 120, 142, 144. For instance, the act 606 may include receiving a request to share the one or more analytics visualizations 120, 142, 144 described above.

In addition, as shown in FIG. 6, the method 600 also includes an act 608 of generating a second set of data elements. In particular, the act 608 may include generating a second set of data elements that includes one or more data elements based on the one or more analytics visualizations 120, 142, 144, wherein the second set of data elements is a subset of the first set of data elements. Moreover, the act 608 may also include identifying one or more characteristics related to a user (e.g., a user of the curated digital analytics workspace). For instance, the one or more characteristics related to the user may comprise a title associated with the user; a responsibility associated with the user; one or more analytics visualizations previously utilized by the user; one or more data elements previously utilized by the user; and a group associated with the user. The act 608 may also include generating the second set of data elements based on the identified one or more characteristics. Similarly, the act 608 may also include generating a second set of analytics visualizations 314, 316, 318 that includes the one or more analytics visualizations, wherein the second set of analytics visualizations 314, 316, 318 is a subset of the first set of analytics visualizations.

In addition, the act 608 may include suggesting one or more analytics visualizations and/or one or more data elements based on the identified one or more characteristics related to the user. For instance, the act 608 may include suggesting a data element from the first set of data elements and/or an analytics visualization based on the one or more identified characteristics related to the user. Moreover, the act 608 may include receiving a user interaction with regard to the suggested data element and the suggested analytics visualization.

As illustrated in FIG. 6, the method 600 also includes an act 610 of generating a curated digital analytics workspace 306 that provides access to the second set of data elements. In particular, the act 610 may include generating, by the at least one processor, a curated digital analytics workspace 306 that includes the one or more analytics visualizations and provides access to the second set of data elements and allows manipulation of the one or more analytics visualizations 314, 316, 318 using the second set of data elements. In addition, the act 610 may include generating the curated digital analytics workspace 306 such that the curated digital analytics workspace 306 allows for generation of at least one additional analytics visualization 314, 316, 318 from the second set of data elements and manipulation of the at least one additional analytics visualization from the second set of data elements using the second set of analytics visualizations.

The act 610 may also include receiving a user interaction with regard to the curated digital analytics workspace and one or more of the second set of data elements and generating a modified analytics visualization 316 in the curated digital analytics workspace based on the user interaction with regard to the curated digital analytics workspace 306 and the one or more of the second set of data elements. Moreover, the act 610 may include suggesting one or more analytics visualizations based on the modified analytics visualization in the curated digital analytics workspace 306.

In addition, receiving a user interaction with regard to the curated digital analytics workspace 306 and one or more of the second set of data elements may comprise: receiving a select event in relation to a second representation of at least one data element from the second set of data elements in a first portion of a second user interface, receiving a drag event in relation to the second representation, the drag event comprising moving the second representation from the first portion of the first user interface to a second portion of the second user interface, and receiving a release event in relation to the second representation, the release event occurring when the second representation is located in the second portion of the first user interface.

The act 610 may also include suggesting one or more new analytics visualizations based on the received user interaction. For instance, the act 610 may include suggesting a new analytics visualization from the second set of analytics visualizations based on the received user interaction. Moreover, the act 610 may include generating a curated digital analytics workspace such that the curated digital analytics workspace includes a suggested analytics visualization and provides access to a suggested data element based on receiving a user interaction with regard to the suggested data element and the suggested analytics visualization.

Furthermore, the act 610 can include identifying one or more characteristics relating to a user of the curated digital analytics workspace 306 and suggesting one or more new analytics visualizations based on the identified one or more characteristics of the user of the curated digital analytics workspace.

In addition, the method 600 may also include providing a digital analytics workspace that provides access to and allows manipulation of a third set of data elements to create analytics visualizations, suggesting at least one analytics visualization based on the one or more analytics visualizations, and suggesting a fourth set of data elements based on the second set of data elements.

The method 600 may also include, identifying one or more characteristics related to a second user; identifying a correlation between the one or more characteristics related to the user and the one or more characteristics related to the second user; and identifying a data element previously utilized by the second user. Furthermore, the method 600 may include generating the second set of data elements based on the correlation between the one or more characteristics related to the user and the one or more characteristics related to the second user and the identified data element previously utilized by the second user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
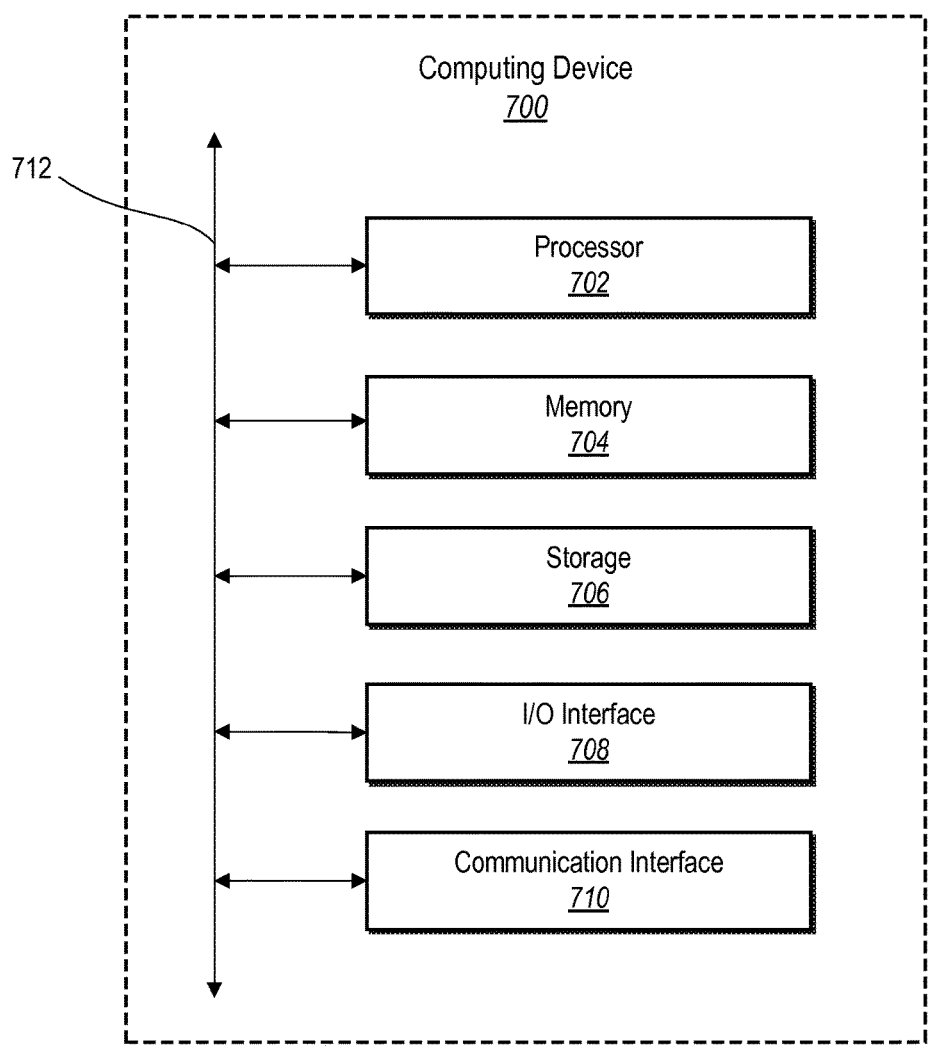
FIG. 7 illustrates a block diagram of an exemplary computing device in accordance with one or more embodiments.

FIG. 7 illustrates, in block diagram form, an exemplary computing device 1100 that may be configured to perform one or more of the processes described above. One will appreciate that the policy selection system 100 can comprise implementations of the computing device 700. As shown by FIG. 7, the computing device can comprise a processor 702, memory 704, a storage device 706, an I/O interface 708, and a communication interface 710. While an exemplary computing device 700 is shown in FIG. 7, the components illustrated in FIG. 7 are not intended to be limiting. Additional or alternative components may be used in other embodiments. Furthermore, in certain embodiments, a computing device 700 can include fewer components than those shown in FIG. 7. Components of computing device 700 shown in FIG. 7 will now be described in additional detail.

In particular embodiments, processor(s) 702 includes hardware for executing instructions, such as those making up a computer program. As an example and not by way of limitation, to execute instructions, processor(s) 702 may retrieve (or fetch) the instructions from an internal register, an internal cache, memory 704, or a storage device 706 and decode and execute them. In particular embodiments, processor(s) 702 may include one or more internal caches for data, instructions, or addresses. As an example and not by way of limitation, processor(s) 702 may include one or more instruction caches, one or more data caches, and one or more translation lookaside buffers (TLBs). Instructions in the instruction caches may be copies of instructions in memory 704 or storage 706.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The computing device 700 includes a storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to the computing device 700. In particular embodiments, storage device 706 is non-volatile, solid-state memory. In particular embodiments, storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 700 also includes one or more input or output ("I/O") devices/interfaces 708, which are provided to allow a user to provide input to (such as user strokes), receive output from, and otherwise transfer data to and from the computing device 700. These I/O devices/interfaces 708 may include a mouse, keypad or a keyboard, a touch screen, camera, optical scanner, network interface, modem, other known I/O devices or a combination of such I/O devices/interfaces 708. The touch screen may be activated with a stylus or a finger.

The I/O devices/interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device and one or more other computing devices 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 710. As an example and not by way of limitation, computing device 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 700 may include any suitable communication interface 710 for any of these networks, where appropriate.

The computing device 700 can further include a bus 712. The bus 712 can comprise hardware, software, or both that couples components of computing device 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a web-based, digital medium environment that gathers, manipulates, and presents digital data to a plurality of computing devices, a method of curating and presenting an analytic workspace within a graphical user interface comprising:
   providing, via a user interface of a first client device, a digital analytics workspace that provides access to and allows manipulation of a first set of data elements to create analytics visualizations;
   generating, by at least one processor and based on user input received via the digital analytics workspace, one or more analytics visualizations using a plurality of data elements of the first set of data elements;
   receiving, via the first client device, a request to share the one or more analytics visualizations;
   in response to receiving the request to share the one or more analytics visualizations and based on the plurality of data elements of the first set of data elements utilized to generate the one or more analytics visualizations:
   automatically selecting a curated set of data elements comprising some but not all of the first set of data elements and at least one additional data element not included in the plurality of data elements utilized to generate the one or more analytics visualizations; and
   generating, by the at least one processor, a curated digital analytics workspace for utilization by a second client device, wherein the curated digital analytics workspace includes the one or more analytics visualizations, limits access of the second client device to only the curated set of data elements comprising some but not all of the first set of data elements and at least one additional data element not included in the plurality of data elements utilized to generate the one or more analytics visualizations, and allows manipulation of the one or more analytics visualizations using only the curated set of data elements.

2. The method of claim 1, further comprising:
   receiving, via the second client device, a user interaction with regard to the curated digital analytics workspace and one or more of the curated set of data elements; and
   generating, for the second client device, a modified analytics visualization in the curated digital analytics workspace based on the user interaction with regard to the curated digital analytics workspace and the one or more of the curated set of data elements.

3. The method of claim 2, wherein automatically selecting the curated set of data elements comprises:
   suggesting, via the first client device, a curated data element from the curated set of data elements, wherein the curated data element is not one of the data elements of the first set of data elements utilized to generate the one or more analytics visualizations; and
   based on user interaction with the curated data element via the first client device, including the curated data element in the curated set of data elements.

4. The method of claim 3, further comprising:
   identifying one or more characteristics relating to a user of the second client device; and
   suggesting the curated data element that is not one of the data elements of the first set of data elements utilized to generate the one or more analytics visualizations via the first client device based on the identified one or more characteristics of the user of the second client device.

5. The method of claim 3, further comprising suggesting the curated data element that is not one of the data elements of the first set of data elements utilized to generate the one or more analytics visualizations based on a determination that a user of the second client device previously interacted with the curated data element.

6. The method of claim 3, further comprising:
   suggesting the curated data element that is not one of the data elements of the first set of data elements utilized to generate the one or more analytics visualizations based on a determination that a user of the first client device previously interacted with the curated data element.

7. The method of claim 3, further comprising:
   providing for display via the user interface of the first client device, an auto curate selectable element;
   based on user interaction with the auto curate selectable element, providing the curated data element for display via the user interface of the first client device.

8. The method of claim 1, further comprising:
identifying one or more characteristics of a user of the second client device and the curated digital analytics workspace; and
generating the curated set of data elements based on the identified one or more characteristics.

9. In a web-based, digital medium environment that gathers, manipulates, and presents digital data to a plurality of computing devices, a method of curating and presenting an analytics workspace within a graphical user interface, comprising:
providing, via a user interface of a first client device, a digital analytics workspace that provides access to and allows manipulation of a first set of data elements to create analytics visualizations;
generating, by at least one processor and based on user input received via the digital analytics workspace, one or more analytics visualizations using a plurality of data elements of the first set of data elements;
identifying one or more characteristics related to a user of a second client device;
based on the identified one or more characteristics related to the user of the second client device and the plurality of data elements of the first set of data elements utilized to generate the one or more analytics visualizations and in response to receiving a request to share the one or more analytics visualizations generated based on user input received via the digital analytics workspace:
automatically selecting a curated set of data elements comprising some but not all of the first set of data elements and at least one additional data element not included in the plurality of data elements utilized to generate the one or more analytics visualizations; and
generating, by the at least one processor, a curated digital analytics workspace for utilization by the second client device, wherein the curated digital analytics workspace includes the one or more analytics visualizations, limits access of the second client device to only the curated set of data elements comprising some but not all of the first set of data elements and at least one additional data element not included in the plurality of data elements utilized to generate the one or more analytics visualizations, and allows manipulation of the one or more analytics visualizations using only the curated set of data elements.

10. The method of claim 9, further comprising:
receiving, via the second client device, a user interaction with regard to the curated digital analytics workspace and one or more of the curated set of data elements; and
generating, for the second client device, a modified analytics visualization in the curated digital analytics workspace based on the user interaction with regard to the curated digital analytics workspace and the one or more of the curated set of data elements.

11. The method of claim 10, further comprising suggesting, via the first client device, one or more analytics visualizations based on the modified analytics visualization in the curated digital analytics workspace.

12. The method of claim 10,
wherein the one or more analytics visualizations comprise a first analytics visualization and a second analytics visualization;
further comprising, generating a third set of data elements based on the one or more analytics visualizations, wherein the curated set of data elements includes at least one data element not included in the third set of data elements; and
wherein the curated digital analytics workspace includes the first analytics visualization and the second analytics visualization and allows manipulation of the first analytics visualization using the curated set of data elements and the second analytics visualization using the third set of data elements.

13. The method of claim 9, wherein the one or more characteristics related to the user of the second client device comprise: a title associated with the user of the second client device; a responsibility associated with the user of the second client device; one or more analytics visualizations previously utilized by the user of the second client device; one or more data elements previously utilized by the user of the second client device; and a group associated with the user of the second client device.

14. The method of claim 9, further comprising:
based on the one or more identified characteristics related to the user of the second client device, suggesting, via the first client device, a data element from the first set of data elements and an analytics visualization;
receiving, via the first client device, a user interaction with regard to the suggested data element and the suggested analytics visualization; and
based on the received user interaction, generating the curated digital analytics workspace such that the curated digital analytics workspace includes the suggested analytics visualization and provides access to the suggested data element.

15. The method of claim 9, wherein:
generating the one or more analytics visualizations comprises, generating the one or more analytics visualizations from a first set of analytics visualizations;
generating the curated set of data elements further comprises, generating, based on the identified one or more characteristics related to the user, a curated set of analytics visualizations that includes the one or more analytics visualizations, wherein the curated set of analytics visualizations is a subset of the first set of analytics visualizations; and
generating the curated digital analytics workspace further comprises, generating the curated digital analytics workspace such that the curated digital analytics workspace allows for generation of at least one additional analytics visualization based on the curated set of data elements and manipulation of the at least one additional analytics visualization using the curated set of data elements.

16. The method of claim 9, further comprising:
identifying one or more characteristics related to a second user;
identifying a correlation between the one or more characteristics related to the user and the one or more characteristics related to the second user;
identifying a data element previously utilized by the second user; and
generating the curated set of data elements based on the correlation between the one or more characteristics related to the user and the one or more characteristics related to the second user and the identified data element previously utilized by the second user.

17. A system for curating and presenting an analytic workspace within a graphical user interface, comprising:
at least one processor;

at least one non-transitory computer readable storage medium storing instructions thereon, that, when executed by the at least one processor, cause the system to:
provide, via a user interface of a first client device, a digital analytics workspace that provides access to and allows manipulation of a first set of data elements to create analytics visualizations;
generate, by the at least one processor and based on user input received via the digital analytics workspace, one or more analytics visualizations using a plurality of data elements of the first set of data elements;
receive, via the first client device, a request to share the one or more analytics visualizations;
in response to the received request to share the one or more analytics visualizations and based on the plurality of data elements of the first set of data elements utilized to generate the one or more analytics visualizations:
automatically select a curated set of data elements comprising some but not all of the first set of data elements and at least one additional data element not included in the plurality of data elements utilized to generate the one or more analytics visualizations; and
generate, by the at least one processor, a curated digital analytics workspace for utilization by a second client device, wherein the curated digital analytics workspace includes the one or more analytics visualizations, limits access of the second client device to only curated set of data elements selected comprising some but not all of the first set of data elements utilized to generate the one or more analytics visualizations, and allows manipulation of the one or more analytics visualizations using only the curated set of data elements.

18. The system of claim 17, further comprising instructions that, when executed by the at least one processor, cause the system to:
receive, via the second client device, a user interaction with the curated set of data elements;
generate one or more modified analytics visualizations from a curated set of analytics visualizations based on the received user interaction; and
suggest, via the second client device, one or more new analytics visualizations based on the received user interaction.

19. The system of claim 17, further comprising instructions that, when executed by the at least one processor, cause the system to:
identify one or more characteristics related to a user of the second client device; and
suggest one or more analytics visualizations and one or more data elements based on the identified one or more characteristics related to the user of the second client device.

20. The system of claim 17, further comprising instructions that, when executed by the at least one processor, cause the system to:
generate the one or more analytics visualizations by generating the one or more analytics visualizations from a first set of analytics visualizations;
generate a curated set of analytics visualizations that includes the one or more analytics visualizations, wherein the curated set of analytics visualizations is a subset of the first set of analytics visualizations; and
generate the curated digital analytics workspace such that the curated digital analytics workspace allows for generation of at least one additional analytics visualization from the curated set of data elements and manipulation of the at least one additional analytics visualization using the curated set of data elements.

* * * * *